United States Patent
Slack-Smith

(10) Patent No.: US 7,627,644 B2
(45) Date of Patent: Dec. 1, 2009

(54) RECIPIENT-CENTRED PROACTIVE CACHING IN A PEER-TO-PEER SYSTEM

(75) Inventor: David Geoffrey Slack-Smith, Darlinghurst (AU)

(73) Assignee: Canon Kabushiki Kaisha, Tokyo (JP)

(*) Notice: Subject to any disclaimer, the term of this patent is extended or adjusted under 35 U.S.C. 154(b) by 345 days.

(21) Appl. No.: 10/992,721

(22) Filed: Nov. 22, 2004

(65) Prior Publication Data
US 2005/0120133 A1 Jun. 2, 2005

(30) Foreign Application Priority Data
Nov. 28, 2003 (AU) .............................. 2003906610

(51) Int. Cl.
G06F 15/167 (2006.01)
(52) U.S. Cl. ................... 709/213; 709/201; 709/217
(58) Field of Classification Search ................ 709/234, 709/213, 201, 217
See application file for complete search history.

(56) References Cited

U.S. PATENT DOCUMENTS

| | | | | |
|---|---|---|---|---|
| 5,802,292 | A * | 9/1998 | Mogul ........................ | 709/203 |
| 6,098,064 | A | 8/2000 | Pirolli et al. ..................... | 707/2 |
| 6,167,438 | A * | 12/2000 | Yates et al. .................. | 709/216 |
| 6,192,401 | B1 * | 2/2001 | Modiri et al. ................ | 709/220 |
| 6,335,927 | B1 | 1/2002 | Elliott et al. ................ | 370/352 |
| 6,449,588 | B1 | 9/2002 | Bowman-Amuah .......... | 703/21 |
| 6,665,728 | B1 * | 12/2003 | Graumann et al. .......... | 709/232 |
| 6,891,798 | B1 * | 5/2005 | Yip et al. ..................... | 370/230 |
| 7,062,756 | B2 * | 6/2006 | Kamen et al. ................ | 717/127 |
| 7,181,523 | B2 * | 2/2007 | Sim .......................... | 709/226 |
| 7,188,145 | B2 * | 3/2007 | Lowery et al. .............. | 709/214 |
| 2002/0007404 | A1 * | 1/2002 | Vange et al. ................ | 709/217 |
| 2002/0107934 | A1 | 8/2002 | Lowery et al. .............. | 709/213 |
| 2003/0101267 | A1 * | 5/2003 | Thompson et al. .......... | 709/227 |
| 2003/0195940 | A1 * | 10/2003 | Basu et al. ................... | 709/213 |
| 2003/0204613 | A1 | 10/2003 | Hudson et al. .............. | 709/231 |
| 2004/0010592 | A1 * | 1/2004 | Carver et al. ................ | 709/226 |
| 2005/0021758 | A1 * | 1/2005 | White ........................ | 709/226 |
| 2007/0124476 | A1 * | 5/2007 | Oesterreicher et al. ...... | 709/226 |

OTHER PUBLICATIONS

Giwon On, Jens Schmitt, Ralf Steinmetz; "The Effectiveness of Realistic Replication Strategies on Quality of Availability for Peer-to-Peer Systems"; May 2003; IEEE Computer Society; pp. 1-8.*

Ranjita Bhagwan, Stefan Savage, Geoffrey M. Voelker, "Replication Strageties for Highly Available Peer-to-Peer Storage Systems"; Jun. 2, 2003; pp. 1-15; retrieved from http://sysnet.ucsd.edu/~rbhagwan/papers/rep-p2p.pdf on Mar. 19, 2008.*

(Continued)

*Primary Examiner*—Andrew Caldwell
*Assistant Examiner*—Oleg Survillo
(74) *Attorney, Agent, or Firm*—Fitzpatrick, Cella, Harper & Scinto

(57) ABSTRACT

A method (100) of caching data is disclosed. The method (100) optimises proactive caching of data by estimating future demand for particular data within a computer system (1900). The computer system (1900) is typically configured in accordance with the hybrid peer-to-peer model. The method (100) maintains the bandwidth cost of proactive caching in proportion to expected demand for particular data. The method (100) also determines the availability of a peer. The availability of a peer is defined herein as the probability of a peer being online, for example, when particular data is required by another peer.

7 Claims, 21 Drawing Sheets

OTHER PUBLICATIONS

Vivek Vishnumurthy, Sangeeth Chandrakumar, Emin Gun Sirer; "KARMA: A Secure Ecomonic Framework for Peer-to-Peer Resource Sharing"; Jun. 2003; pp. 1-7.*

Frank Dabek, M. Frans Kaashoek, David Karger, Robert Morris, Ion Stoica; "Wide-area cooperative storage with CFS"; Oct. 2001; SOSP '01; pp. 1-14.*

Andre Rosin; "Measuring Availability in Peer-to-Peer Networks"; Sep. 11, 2003; pp. 1-11; retrieved from http://warhol.wiwi.hu-berlin.de/~fis/p2pe/paper_A_Rosin.pdf on Aug. 25, 2008.*

Juan Segarra, et al.; "Placement of Storage Capacity in Distributed Video Servers"; 2002; pp. 2537-2541; retrieved on Aug. 25, 2008.*

Damien Stolarz; "Peer-to-peer Streaming Media Delivery"; Mar. 9, 2003, as evidenced by Internet Achive WayBack Machine; 5 pages; retrieved from http://web.archive.org/web/20030309155631/http://www.robotarmy.com/dstolarz/P2PStreamingMediaDelivery.pdf on Aug. 25, 2008.*

Notice of Acceptance dated Feb. 13, 2008 in corresponding Australian Application No. 2004233480.

* cited by examiner

RECIPIENT-CENTRED PROACTIVE CACHING IN A PEER-TO-PEER SYSTEM

CROSS-REFERENCE TO RELATED PATENT APPLICATIONS

This application claims the right of priority under 35 U.S.C. § 119 based on Australian Patent Application No. 2003906610, filed 28 Nov. 2003, which is incorporated by reference herein in its entirety as if fully set forth herein.

FIELD OF THE INVENTION

The present invention relates generally to file sharing and, in particular, to a method and apparatus for caching data over a network. The present invention also relates to a computer program product including a computer readable medium having recorded thereon a computer program for caching data over a network.

BACKGROUND

There are several well-known models for exchanging data between a plurality of computers connected together over a network. One of these models is known as the "client/server model", in which a client computer (i.e., a client) sends a request for data to a server computer (i.e., a server) and waits for a response. Such a server typically has a relatively large bandwidth, processing power and storage capacity and is responsible for indexing, locating, retrieving, storing, caching and securing data. The server extracts the data from a relational database, for example, and transmits the requested data to the client in response to a client request. The server also ensures data integrity and enforces any access policy associated with the requested data.

The server is usually maintained by a "data-publisher", which is configured to "publish" the data. Such publication may include extracting data, building documents to a size based on a request, building tables of the data with user-specified or request-driven ruling, borders, shading, colours, etc, automatic numbering of pages, adjustment of binding margins and table sizes, and formatting of numeric data, for example.

In contrast to servers, clients typically have relatively smaller bandwidth, processing power and storage capacity, and incorporate very simple and limited logic. The primary responsibility of a client is to initiate and complete "transactions" with the server. As such, clients are pure consumers of data published by the server. Users who wish to publish data must upload the data to a server in accordance with the client/server model.

Another well-known model for exchanging data between a plurality of computers connected together over a network is known as the "peer-to-peer model", where the term peer refers to each of the computers connected together over the network. The peer-to-peer model is a fully distributed and decentralised model. The peers connected to a network are considered to be equal and there are no peers with special administrative roles. The peers are organised in a flat (i.e. non-hierarchical) structure and connections are formed in an ad-hoc manner. Any peer may "publish" data to, and "consume" data from, any other peer. Such peers are considerably more complex than the clients discussed above and often come in a variety of hardware and software configurations.

Still another model for exchanging data between a plurality of computers connected together over a network is known as a hybrid "peer-to-peer model". In the hybrid peer-to-peer model, in addition to the peers, there is at least one server with a special administrative role. Essentially, in the hybrid peer-to-peer model the server facilitates communication between the peers. The music and movies web site, Napster™, is the best-known example of a software system that uses a hybrid peer-to-peer model. Napster™ uses a cluster of servers to index content so that a peer can find other peers having the content for which the peer is searching. One disadvantage of the hybrid peer-to-peer model is that in the absence of a central server, the quality of service may be reduced. For example, if the central server used by the Napster™ system was offline, then Napster™ peers find it difficult to access data on other Napster™ peers.

Some software applications (e.g. the Gnutella™ and the FreeNet™ application) allow for the sharing of files between peers without any centralised facilities requiring a server. However, none of these applications perform "proactive caching". Proactive caching is the storage of extra copies of particular data on one or more peers before any users actually choose to download the data. In contrast, FreeNet™ caches data reactively. That is, if a peer (i.e., the requesting peer) requests data (e.g., an image) to be downloaded over a network from another peer (i.e., the downloading peer), then the data may thereafter be cached on one or more other peers of the network. The peers on which the data is cached are typically those peers in the path between the downloading peer and the requesting peer.

One known software application referred to as the Cooperative File System (CFS), allows distributed data storage without a central server. CFS uses a distributed hash table to determine where to store data and from where to retrieve the data. CFS also proactively caches data using such a distributed hash table. However, the disadvantage of CFS and other like systems is that a large amount of bandwidth is required to perform proactive caching.

Thus, a need clearly exists for an improved method of proactively caching data.

SUMMARY

It is an object of the present invention to substantially overcome, or at least ameliorate, one or more disadvantages of existing arrangements.

According to a first aspect of the present invention there is provided a method of caching data over a network, said method comprising the steps of:

estimating demand for said data from one or more peers connected to said network;

estimating transmission capacity of at least one of said peers;

selecting one or more of said peers, based on the estimated transmission capacity of each of said peers, in order to meet said demand; and processing at least a portion of said data or further data associated with one or more of the selected peers in order to enable at least said portion of data to be cached over said network.

According to another aspect of the present invention there is provided a method of caching data over a network, said method comprising the steps of:

estimating demand for said data from one or more peers connected to said network;

estimating transmission capacity of each of said peers;

selecting one or more of said peers, based on the estimated transmission capacity of each of said peers, in order to meet said demand; and instructing one or more of the selected peers to cache at least a portion of said data.

According to still another aspect of the present invention there is provided a method of downloading data over a network from one or more peers connected to said network, said method comprising the step of:

selecting a subset of said peers based on which of said peers are available at a particular time, each peer of said subset containing at least a portion of said data stored thereon;

assigning a weight to each of the peers of said subset depending on bandwidth available to each of the peers of said subset; and downloading said data at said particular time, from at least a particular one of the peers of said subset, depending on the weight assigned to said particular peer.

According to still another aspect of the present invention there is provided an apparatus for caching data over a network, said apparatus comprising:

demand estimation means for estimating demand for said data from one or more peers connected to said network;

transmission capacity estimation means for estimating transmission capacity of each of said peers;

peer selection means for selecting one or more of said peers, based on the estimated transmission capacity of each of said peers, in order to meet said demand; and data processor means for processing at least a portion of said data or further data associated with one or more of the selected peers in order to enable at least said portion of data to be cached over said network.

According to still another aspect of the present invention there is provided an apparatus for caching data over a network, said apparatus comprising:

demand estimation means for estimating demand for said data from one or more peers connected to said network;

transmission capacity estimation means for estimating transmission capacity of each of said peers;

peer selection means for selecting one or more of said peers, based on the estimated transmission capacity of each of said peers, in order to meet said demand; and instructing means for instructing one or more of the selected peers to cache at least a portion of said data.

According to still another aspect of the present invention there is provided an apparatus for downloading data over a network from one or more peers connected to said network, said apparatus comprising:

peer selection means for selecting a subset of said peers based on which of said peers are available at a particular time, each peer of said subset containing at least a portion of said data stored thereon;

weight assignment means for assigning a weight to each of the peers of said subset depending on bandwidth available to each of the peers of said subset; and downloading means for downloading said data at said particular time, from at least a particular one of the peers of said subset, depending on the weight assigned to said particular peer.

According to still another aspect of the present invention there is provided a computer program for caching data over a network, said program comprising:

code for estimating demand for said data from one or more peers connected to said network;

code for estimating transmission capacity of each of said peers;

code for selecting one or more of said peers, based on the estimated transmission capacity of each of said peers, in order to meet said demand; and code for processing at least a portion of said data or further data associated with one or more of the selected peers in order to enable at least said portion of data to be cached over said network.

According to still another aspect of the present invention there is provided a computer program for caching data over a network, said program comprising:

code for estimating demand for said data from one or more peers connected to said network;

code for estimating transmission capacity of each of said peers;

code for selecting one or more of said peers, based on the estimated transmission capacity of each of said peers, in order to meet said demand; and code for instructing one or more of the selected peers to each at least a portion of said data.

According to still another aspect of the present invention there is provided a computer program for downloading data over a network from one or more peers connected to said network, said program comprising:

code of selecting a subset of said peers based on which of said peers are available at a particular time, each peer of said subset containing at least a portion of said data stored thereon;

code for assigning a weight to each of the peers of said subset depending on bandwidth available to each of the peers of said subset; and code for downloading said data at said particular time, from at least a particular one of the peers of said subset, depending on the weight assigned to said particular peer.

BRIEF DESCRIPTION OF THE DRAWINGS

One or more embodiments of the present invention will now be described with reference to the drawings and appendices, in which.

DETAILED DESCRIPTION INCLUDING BEST MODE

Figure 1A:
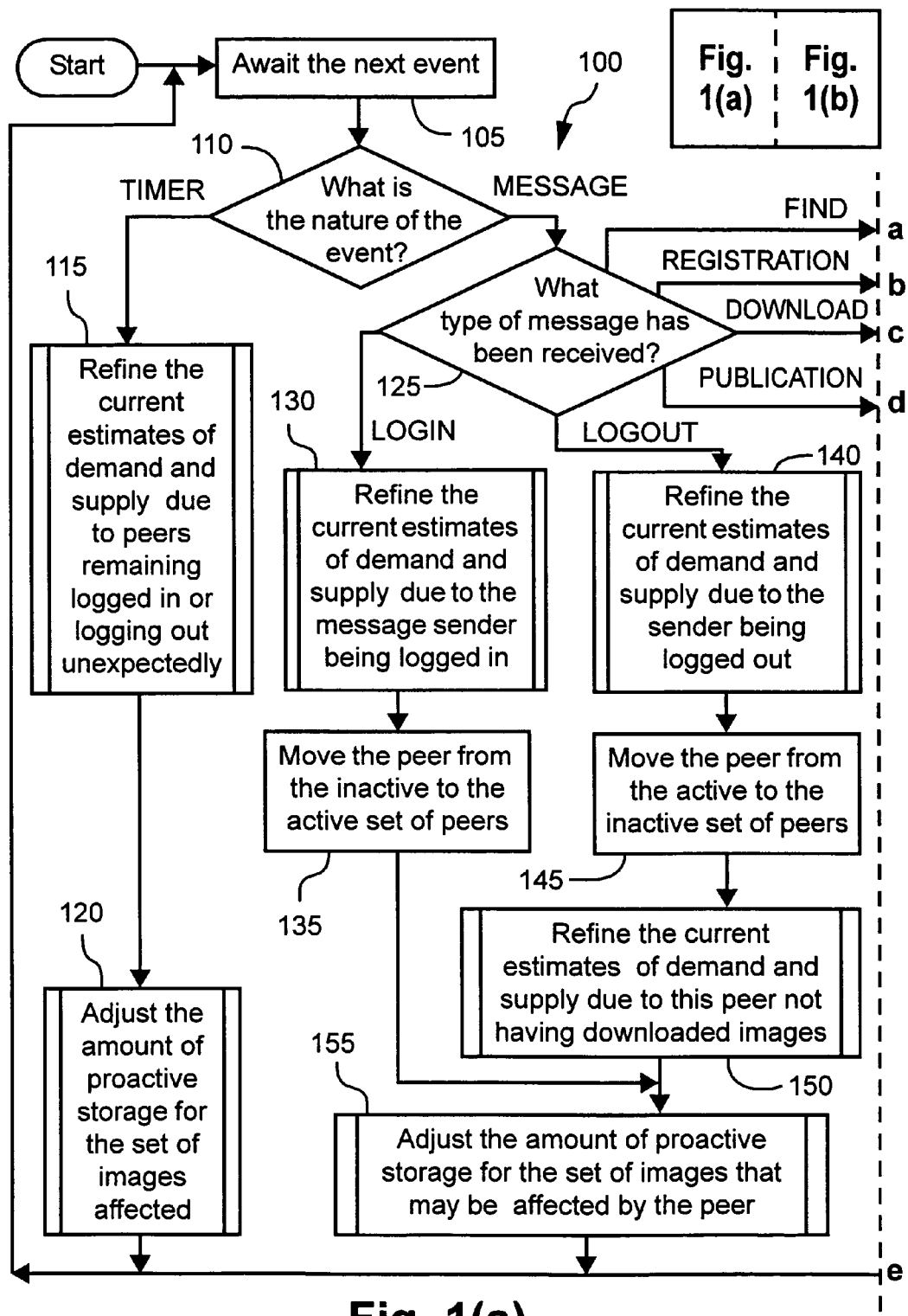
FIG. 1 is a flow diagram showing a method of caching data.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Before proceeding with a description of the embodiments, a brief review of terminology used throughout this description will now be discussed.

Figure 1B:
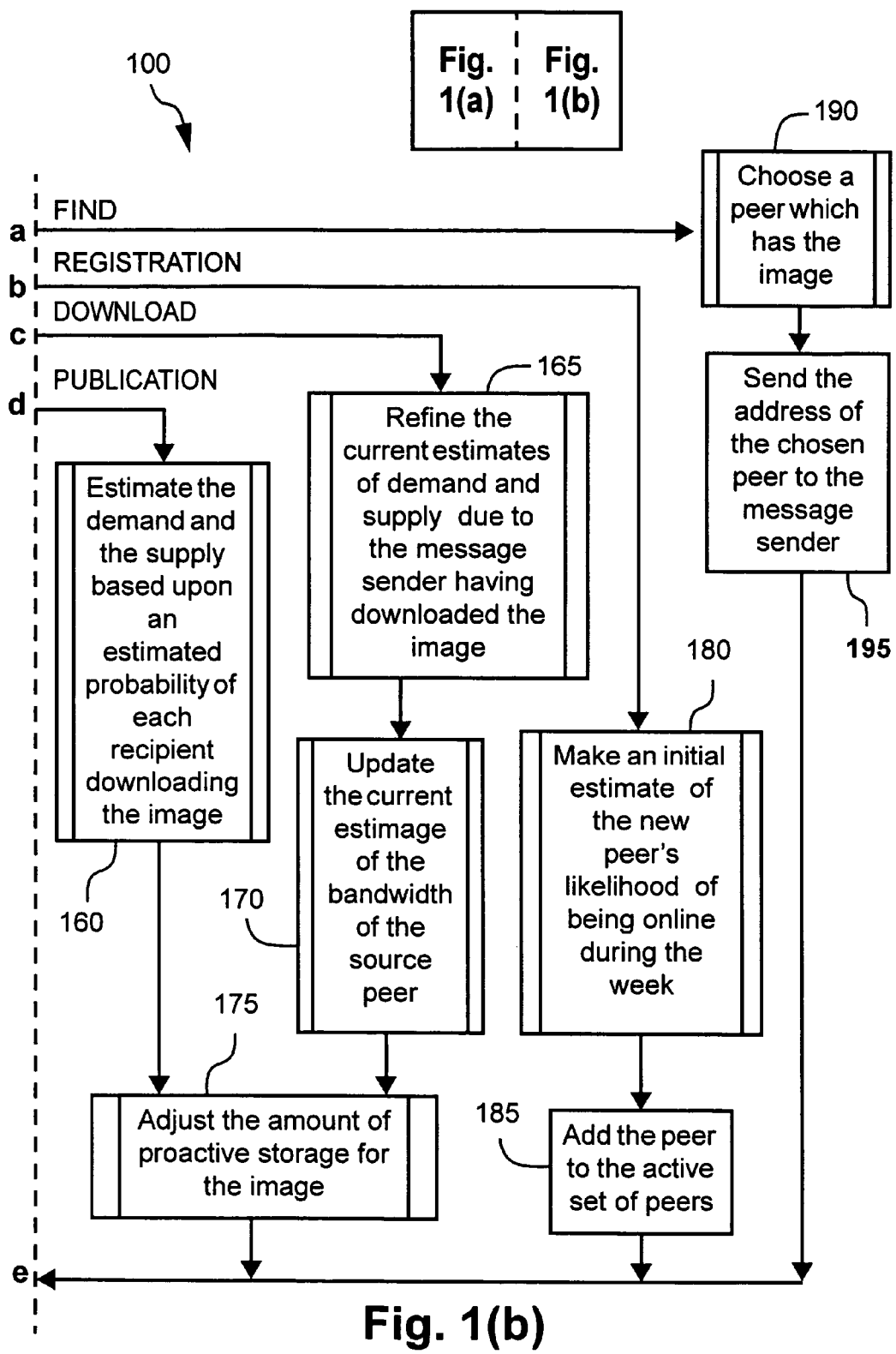
Figure 18:
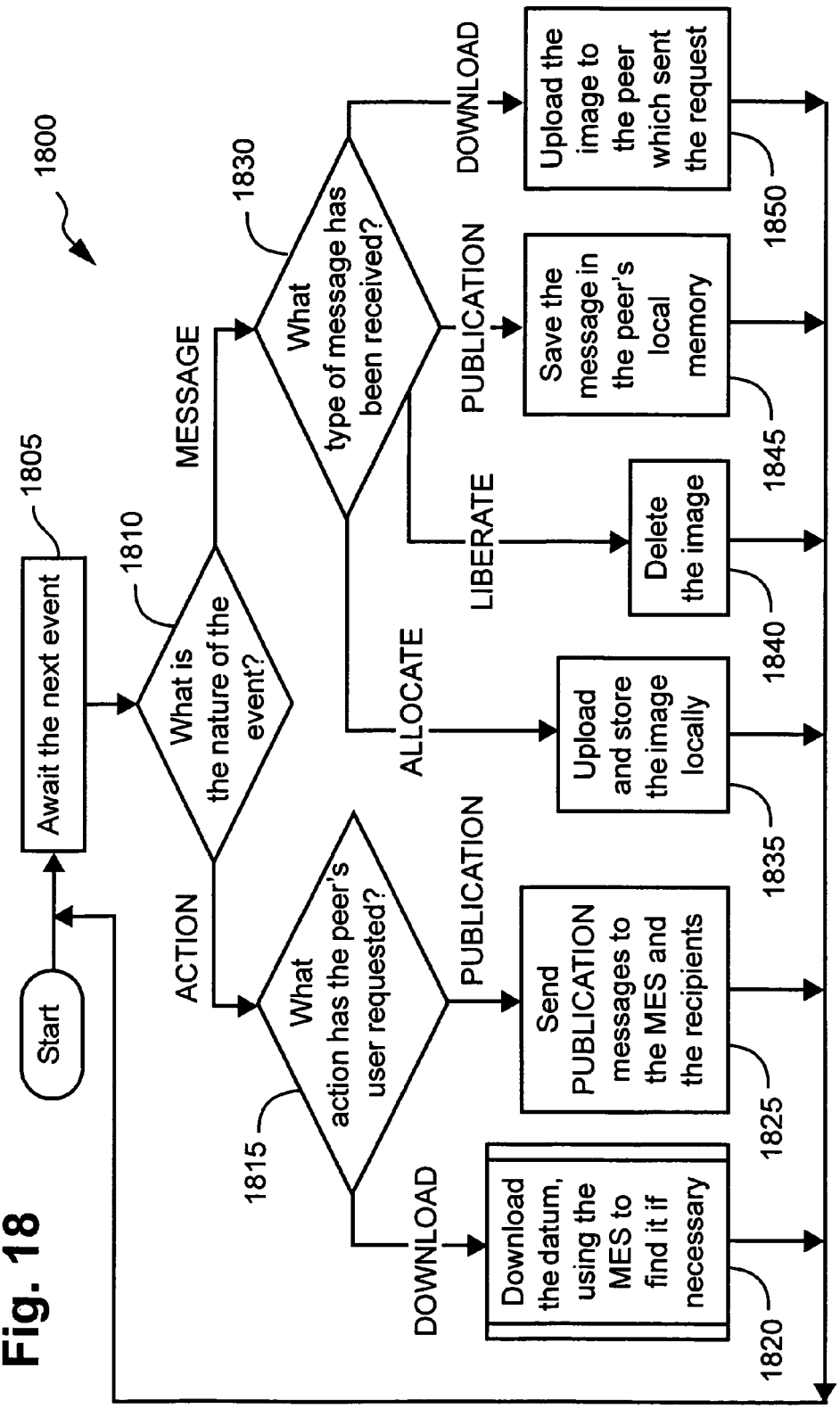
FIG. 18 is a flow diagram showing a method for processing events as executed by one of more of the peers of FIG. 19.
Figure 19:
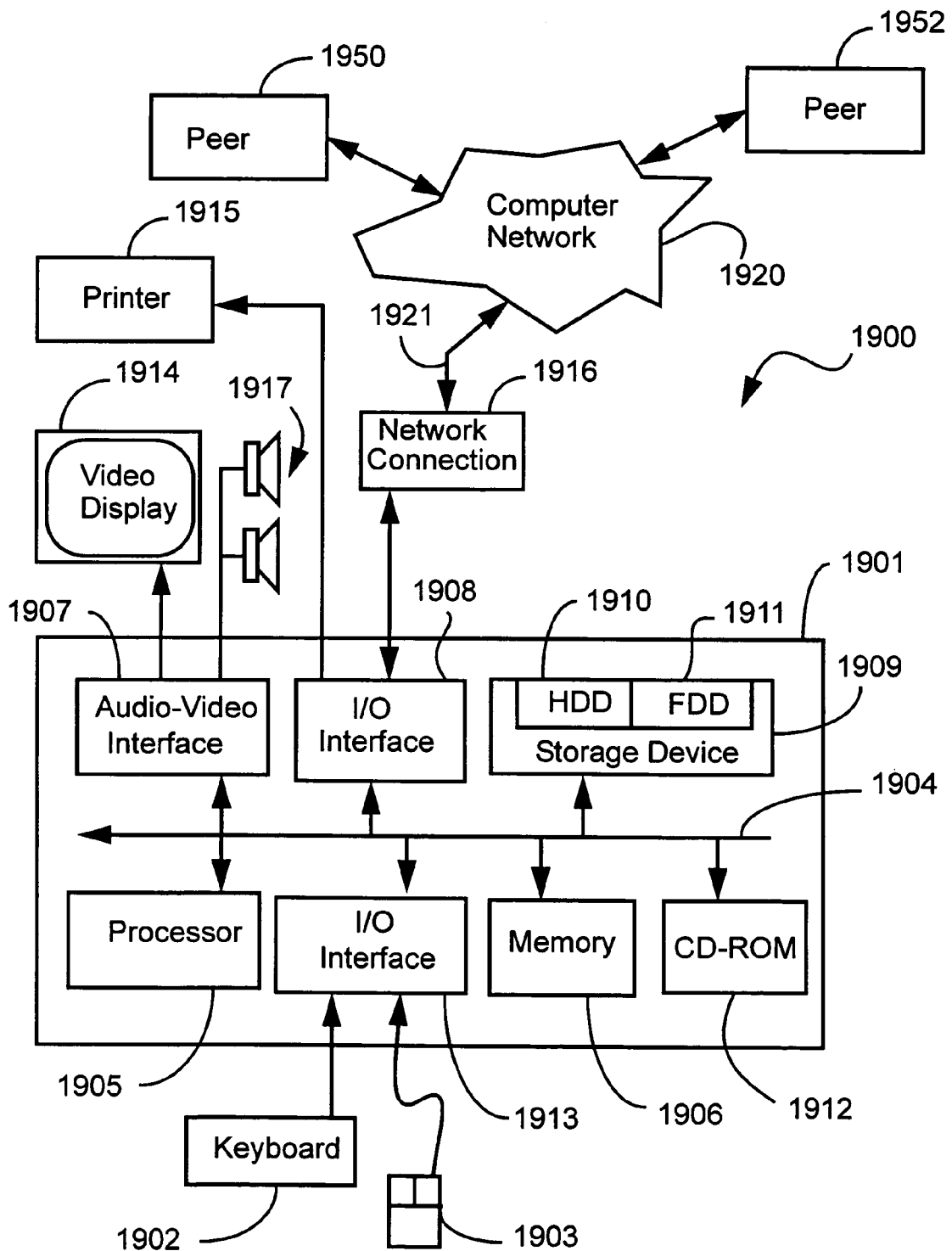
FIG. 19 is a schematic block diagram of a general purpose computer upon which arrangements described can be practiced.

A method 100 (as seen in FIG. 1) of caching data is described below with reference to FIGS. 1 to 19. The method 100 optimises proactive caching of data by estimating future demand for particular data within a computer system 1900 (as seen in FIG. 19). The computer system 1900 is typically configured in accordance with the hybrid peer-to-peer model. The method 100 maintains the bandwidth cost of proactive caching in proportion to expected demand for particular data. The method 100 also determines the availability of a peer. The availability of a peer is defined herein as the probability of a peer being online, for example, when particular data is required by another peer.

For ease of explanation, the steps of the method 100 are described with reference to the sharing of images from digital photo albums. However, it is not intended that the present invention be limited to the described methods. For example, the invention may have application to the sharing of any other type of electronic document such as a text document.

The method 100 is preferably practiced using a computer system 1900, such as that shown in FIG. 19 wherein the processes of FIGS. 1 to 18 may be implemented as software, such as an application program executing within the computer system 1900. The computer system 1900 is formed by a computer module 1901, which in the implementation described herein is configured as a server. The computer module 1901 configured as a server will be referred to hereinafter as the "Measurement and Estimation Server (MES)". The MES 1901 measures the storage capacity of one or more peers of the computer system 1900. The capacity of a peer is herein defined as the availability of a peer (i.e., as defined above) multiplied by bandwidth available to the particular peer.

The MES 1901 also measures the popularity of different images shared over the computer system 1900, in order to estimate how much storage capacity to provide proactively.

As will be explained in more detail below, the popularity of different images is based on the total demand for an image. The total demand for an image is defined herein as the sum of the demand for the image from all of the peers of the computer system 1900. The demand from a particular one of the peers for an image is defined as the capacity of the peer multiplied by the probability of the peer wanting to download the image.

The steps of the method 100 are effected by instructions in software that is executed within the MES 1901. The instructions may be formed as one or more code modules, each for performing one or more particular tasks. The software may also be divided into two separate parts, in which a first part performs the method 100 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the MES 1901 preferably effects an advantageous apparatus for implementing the method 100.

The computer system 1900 is formed by the MES 1901, input devices such as a keyboard 1902 and mouse 1903, output devices including a printer 1915, a display device 1914 and loudspeakers 1917. The MES 1901 is configured for two-way communication with one or more peers 1950, 1952, as shown in FIG. 19, connected to a communications network 1920, via a network connection device 1916 and other functional medium such as a telephone line 1921, for example. The network communication device 1916 may be in the form of a Modulator Demodulator (Modem) transceiver device. Alternatively, the network connection 1916 may be in form of an Asynchronous Digital Subscriber Line (ASDL) connection, an Ethernet connection or a T1 connection, for example, as known to those in the relevant art. Each of the peers 1950 and 1952 connected to the network 1920 typically have a similar configuration to the computer module 1901. The network connection 1916 can be used to obtain access to the Internet, and other network systems, such as a Local Area Network (LAN) or a Wide Area Network (WAN), and may be incorporated into the computer module 1901 in some implementations. In this manner, the computer 1900 can receive messages from the peers 1950, 1952 connected to the network 1920 and also transmit messages to the peers 1950, 1952.

The MES 1901 typically includes one processor unit 1905, and a memory unit 1906, for example, formed from semiconductor random access memory (RAM) and read only memory (ROM). The MES 1901 also includes a number of input/output (I/O) interfaces including an audio-video interface 1907 that couples to the video display 1914 and loudspeakers 1917, an I/O interface 1913 for the keyboard 1902 and mouse 1903 and optionally a joystick (not illustrated), and an interface 1908 for the network connection 1916 and printer 1915. In some implementations, the network connection 1916 may be incorporated within the MES 1901. For example a modem may be configured within the interface 1908. A storage device 1909 is provided and typically includes a hard disk drive 1910 and a floppy disk drive 1911. A magnetic tape drive (not shown) may also be used. A CD-ROM drive 1912 is typically provided as a non-volatile source of data. The components 1905 to 1913 of the MES 1901, typically communicate via an interconnected bus 1904 and in a manner which results in a conventional mode of operation of the computer system 1900 known to those in the relevant art. Examples of computers on which the described arrangements can be practiced include IBM-PC's and compatibles, Sun Sparcstations or alike computer systems evolved therefrom.

Typically, the application program is resident on the hard disk drive 1910 and read and controlled in its execution by the processor 1905. Intermediate storage of the program and any data fetched from the network 1920 may be accomplished using the semiconductor memory 1906, possibly in concert with the hard disk drive 1910. In some instances, the application program may be supplied to the user encoded on a CD-ROM or floppy disk and read via the corresponding drive 1912 or 1911, or alternatively may be read by the user from the network 1920 via the network connection 1916. Still further, the software can also be loaded into the computer system 1900 from other computer readable media. The term "computer readable medium" as used herein refers to any storage or transmission medium that participates in providing instructions and/or data to the computer system 1900 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1901. Examples of transmission media include radio or infra-red transmission channels as well as a network connection to another computer or networked device, and the Internet or Intranets including e-mail transmissions and information recorded on Websites and the like.

The method 100 may alternatively be implemented in dedicated hardware such as one or more integrated circuits performing the functions or sub functions of the method 100. Such dedicated hardware may include graphic processors, digital signal processors, or one or more microprocessors and associated memories.

As will be explained in detail below, the method 100 is executed when a user creates a document (e.g., a digital photo album) on one of the peers 1950 or 1952 connected to the network 1920. The document may be published over the network 1920 to a list of one or more recipients configured within the document. Such publication of a document is referred to herein as a PUBLISH event. The recipients contained within the list are hereinafter referred to as "sharers". Some or all of the sharers may download some or all of the images of the published photo album from the peer (e.g., 1950) being operated by the sharer who created the document (i.e., the author).

During the execution of the method 100, one or more of the sharers may log a peer in and/or out of the network 1920. Such logging in and logging out of a peer is referred to as a LOGIN event and a LOGOUT event, respectively. While a peer is logged into the network 1920 the peer is referred to as an active peer. A list of active peers (ie., those peers currently logged into the network 1920) is preferably configured within memory 1906 of the MES 1901. The list of active peers will hereinafter be referred to as "the active set". A list of inactive peers (ie., those peers not currently logged into the network 1920) is also configured within memory 1906. The list of inactive peers will hereinafter be referred to as "the inactive set". Whilst a peer is active, memory configured within the peer may be used to cache data representing one or more images published over the network 1920. The active and inactive sets are both initialised to empty sets. The processor 1905 adds an identifier corresponding to a particular peer to the active set every time the particular peer is logged into the network 1920 and moves identifiers from the active set to the inactive set every time the processor 1905 becomes aware that a peer has gone off-line.

The method 100 of caching data is preferably implemented as software resident on the hard disk drive 1910 of the MES 1901 and being controlled in its execution by the processor 1905. In accordance with the method 100, the processor 1905 estimates the availability and storage capacity of the peers 1950, 1952 connected to the network 1920 in order to allocate storage space to particular published images. The accuracy of such estimates is subsequently determined and consequently refined as necessary. As such, the MES 1901 increases or decreases the amount of storage allocated to particular images on different peers connected to the network 1920 so as to ensure that the storage capacity which is available to store images is sufficient to meet demand.

Parameters (e.g., transmission capacity) associated with a peer (e.g., 1950) connected to the network 1920 are preferably stored in one or more look-up tables configured within the memory 1906 of the MES 1901. These parameters are used to determine availability and transmission capacity estimates for a peer, and therefore the estimates themselves can vary over time (e.g., a week). A curve defined using the look-up table may be used to interpolate values for each of the parameters at any time. Two such curves, referred to respectively as total supply and total demand curves, for a number of peers may be determined by adding the supply and demand curves associated with each peer. Such addition may be performed by adding corresponding table entries to generate a new look-up table. The new look-up table may be stored in the memory 1910 of the MES 1901. Further, multiplying a curve by a scalar factor may be performed by multiplying each table entry by the scalar factor to generate the new look-up table.

As will be described in more detail below, the multiplication of a curve by a scalar factor may be used to determine the transmission capacity of a peer on the basis of an availability curve and on bandwidth available to the peer.

The method 100 begins at step 105, where the processor 1905 awaits an event such as a timer signal, or a message received over the network 1920 from another computer or peer (e.g., peers 1950, 1952) connected to the network 1920. Upon detecting such an event, execution proceeds to step 110, where the event is examined by the processor 1905 to determine which type of event was detected. If the processor 1905 determines that the event is a timer event then execution continues at step 115. Otherwise, if the event is a message received over the network 1920 from one or the peers 1950, 1952, for example, then execution continues at step 125.

As will be described in detail below, a timer event is generated periodically by the processor 1905 in order to initiate refinement of any previously determined estimates of demand for images cached on peers connected to the network 1920. For example, a timer event may be generated hourly. Such a period (i.e., one hour) allows the processor 1905 configured within the MES 1901 to determine demand estimates efficiently. Alternatively, a different period (e.g., 30 minutes, 2 or 3 hours) may be used. However, one hour timer events are considered to allow a peer sufficient time to download an image even if the bandwidth of the downloading peer is low. Such a period also allows the size of the image to be largely ignored in the generation of estimates of image demand.

At step 115, the processor 1905 refines any previously determined supply and demand estimates, associated with one or more images published over the network 1920, depending on the availability of peers which are connected to the network 1920. That is, the supply and demand estimates may be refined based on the new availability of a peer that was logged into the network 1920 in the previous hour or unavailability of a peer that was logged out of the network 1920 during that period. A method 1100 of refining supply and demand estimates, as executed at step 115, will be explained in more detail below with reference to FIG. 11. The method 100 continues at the next step 120, where the processor 1905 adjusts the amount of proactive storage for the images whose supply and demand estimates have been refined at step 115. A method 1500 of adjusting the amount of proactive storage for a set of images following refinement of supply and demand estimates for the images, will be described in more detail below with reference to FIG. 15. Following step 120, execution returns to step 105.

At step 125, the processor 1905 determines the type of message that was received at step 105.

If the processor 1905 determines, at step 125, that the message is from a peer logging into the network 1920 (i.e., a LOGIN message is detected), then execution continues at step 130. At step 130, in response to the LOGIN message, the processor 1905 refines any previously determined supply and demand estimates, associated with one or more images published over the network 1920. That is, the supply and demand estimates for the published images are refined based on the availability of the peer that was logged into the network 1920 at step 125. A method 400 of refining the supply and demand estimates for an image, as executed at step 130, will be explained in more detail below with reference to FIG. 4. At the next step 135, the processor 1905 moves an identifier, corresponding to the peer that originated the LOGIN message, from the inactive set configured within memory 1910, to the active set in order to record that the particular peer is now logged into the network 1920 (i.e., the peer is online). Following step 135, execution proceeds to step 155 which will be explained in detail below.

If the processor 1905 determines, at step 125, that the message received at step 125 is from a peer logging out of the network 1920 (i.e., a LOGOUT message is detected), then execution continues at step 140. At step 140, in response to the LOGOUT message, the processor 1905 refines any previously determined supply and demand estimates, associated with one or more images published over the network 1920. The supply and demand estimates are refined, at step 140, based on the unavailability of the peer that was logged out of the network 1920. The supply and demand estimates are refined at step 140 in accordance with the method 400. At the next step 145, the processor 1905 moves an identifier corresponding to the peer that was logged out of the network 1920 from the active set configured within memory 1906 to the inactive set. Then at the next step 150, the processor 1905 refines current estimates of total supply and total demand for one or more images published over the network 1920. The current estimates of total supply and total demand are refined based on the peer that was logged out of the network 1920 at step 125. A method 500 of refining current estimates of total supply and total demand for one or more images, due to the presence or absence of an image on a particular peer, as executed at step 150, will be explained in detail below with reference to FIG. 5. Following step 150, execution continues at the next step 155.

At step 155, the processor 1905 adjusts the amount of proactive storage for the set of images affected by the login or logout of the peer at step 125. The processor 1905 adjusts the amount of proactive storage at step 155 by requesting that additional peers connected to the network 1920 upload and cache data or by informing other peers connected to the network 1920 that these other peers can stop caching data. The amount of proactive storage is adjusted at step 155 in accordance with the method 1500. Following step 155, execution returns to step 105.

If the processor 1905 determines, at step 125, that the network message is a request for the publication of an image over the network 1920 (i.e., a PUBLICATION message is detected), then execution continues at step 160. At step 160, the processor 1905 estimates the supply and demand for the image associated with the PUBLICATION message. The supply and demand for the image associated with the PUBLICATION message are estimated based upon estimates of the probability of each sharer, associated with the message, downloading the image in the near future. A method 200 of estimating supply and demand for an image, as executed at step 160, will be described in more detail below with reference to FIG. 2. Following step 160 execution proceeds to the next step 175, which will be described in detail below with reference to FIG. 13.

If the processor 1905 determines, at step 125, that the network message is from a peer that has completed the downloading of an image over the network 1920 (i.e., a DOWNLOAD message is detected), then execution continues at step 165. At step 165, the processor 1905 refines estimates of the total supply and total demand for the image that was downloaded. The total supply and total demand for the image that was downloaded are refined due to extra supply and reduced demand as a result of the peer downloading the image. A method 1400 of refining supply and demand estimates, as executed at step 165, will be described in detail below with reference to FIG. 14. At the next step 170, the processor 1905 modifies capacity estimates for the peer from which the image was downloaded, at step 125, based upon the bandwidth required by the downloading peer in order to download the image. A method 1200 of modifying capacity estimates for peers based upon information from another peer, as executed at step 170, will be described below with reference to FIG. 12.

At step 175, the processor 1905 adjusts the amount of proactive storage for the image that was published or downloaded (i.e., the image associated with the PUBLICATION message or the DOWNLOAD message generated at step 125) by requesting that additional peers connected to the network 1920 upload and cache data representing the image or by informing other peers connected to the network 1920 that these other peers can stop caching data. A method 1300 of modifying the proactive storage for an image, as executed at step 175, will be described in detail below with reference to FIG. 13. Following step 175 execution returns to step 105.

If the processor 1905 determines, at step 125, that the network message is a request for the registration of a peer (i.e., a REGISTRATION message is detected), then execution continues at step 180. A REGISTRATION message is transmitted by a peer the first time that the peer is logged into the network 1920. The REGISTRATION message may comprise a parameter indicating the amount of bandwidth available to the peer that transmitted the REGISTRATION message. At step 180, the processor 1905 registers the peer that transmitted the REGISTRATION message by determining availability of a peer. The availability of the peer is based on the probability of the peer being online at various times of the week. If the bandwidth of a particular peer is low, as indicated by a REGISTRATION message transmitted by the peer, then the processor 1905 assumes that the peer is connected by dialup modem on a somewhat irregular basis. The processor 1905 also assumes that the peer is especially likely to be online at or around a particular time and that the peer is especially likely to be online on a particular day. If the bandwidth of the peer is high, then the processor 1905 assumes that the peer is connected by broadband and may be online at any time of the week. A method 1000 of estimating the availability of a peer, as executed at step 180, will be described below with reference to FIG. 10. At the next step 185, the processor 1905 adds the registering peer to the active set of peers configured within memory 1906. Following step 185, execution returns to step 105.

If the processor 1905 determines, at step 125, that the network message is a request from a peer, which wants to download an image, to find the data representing the image (i.e., a FIND message is detected), then execution continues at step 190. At step 190, the processor 1905 determines which peer is to be selected as a source for the requested image (i.e., the image associated with the FIND message). A method 1700 of determining which peer is to be selected as a source for a requested image made by another peer, as executed at step 190, will be explained in detail below with reference to FIG. 17. At the next step 195, the processor 1905 forwards the address of the peer selected at step 190 to the peer that transmitted the FIND message. Following step 195, execution returns to step 105 and the processor 1905 waits for a next event.

Some images are more popular than others and images from some authors (i.e., a sharer who created an image for publication) are more popular than images from other authors. Further, an image having an associated recipient list specifying a large number of sharers may be downloaded more often.

The MES 1901 may maintain and store an author rating table. Such an author rating table may be used to predict the chance of an image created by a particular sharer being downloaded by a peer, which does not have the image during an hour while the peer is online. The MES 1901 initialises the author rating table to empty when the MES 1901 starts up. However, the MES 1901 adds an extra entry to the author rating table each time a new peer registers. The author rating table may be used to observe the popularity of images from a particular sharer in order to rate and re-rate the sharer. The rating of the sharer in the author rating table is stored in a desirability field of the author rating table, such that each of the sharers has an associated desirability field. The MES 1901 may then use the author rating table and the list of recipients associated with each of the images to determine how much storage is required to satisfy demand for images.

Figure 2:
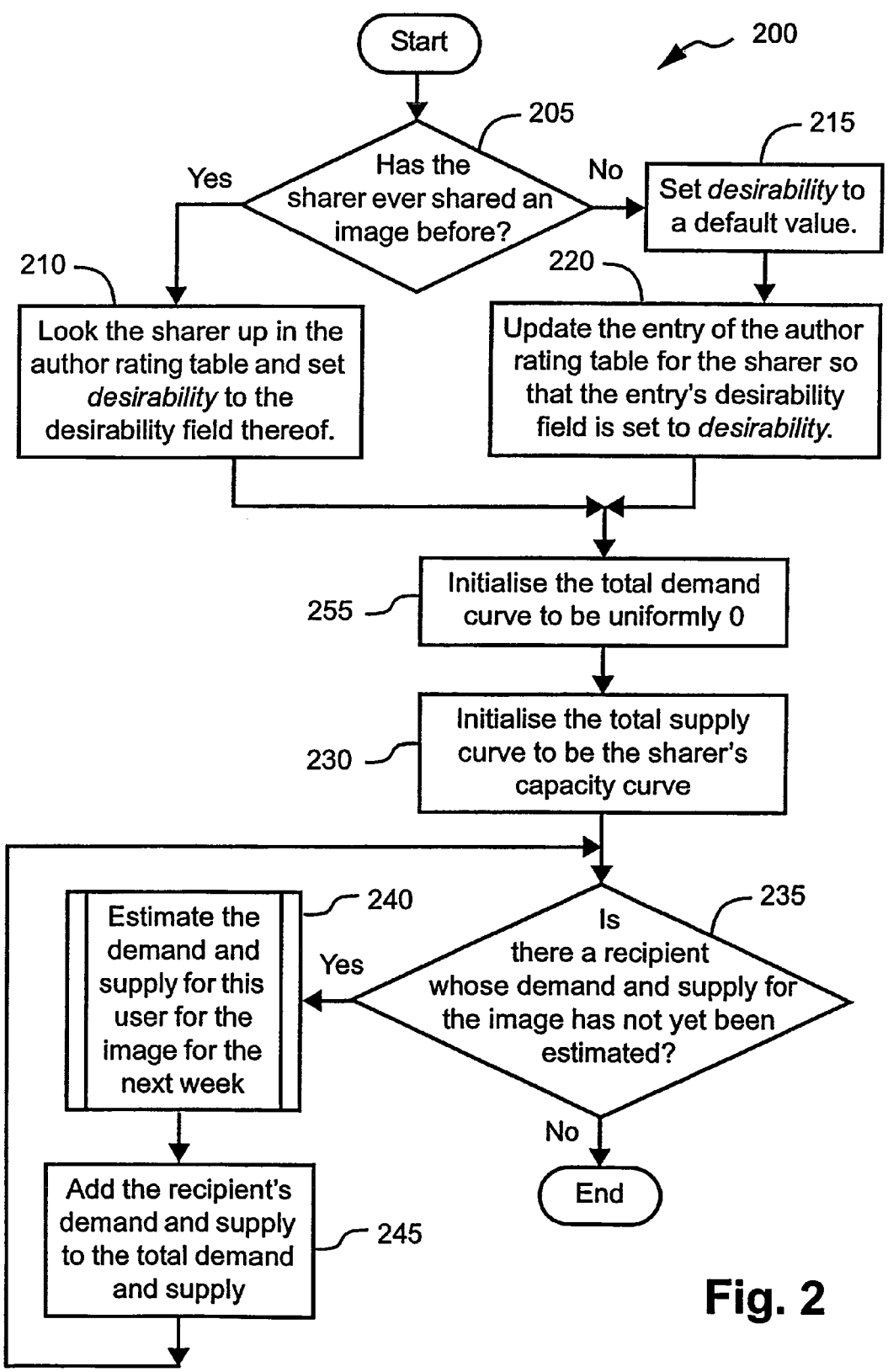
FIG. 2 is a flow diagram showing a method of estimating supply and demand for an image.

The method 200 of estimating supply and demand for an image, as executed at step 160 in response to a PUBLICATION message, will now be described with reference to FIG. 2. The method 200 is preferably implemented as software resident on the hard disk drive 1910 of the MES 1901 and being controlled in its execution by the processor 1905.

The method 200 begins at step 205, where if the processor 1905 determines that the sharer that transmitted the PUBLICATION message at step 125 has ever shared an image before, then execution proceeds to step 210. Otherwise, execution continues at step 215.

At step 210, the processor 1905 looks up the sharer who transmitted the PUBLICATION message in the author rating table. The processor 1905 then sets a desirability parameter for the sharer to the value of the desirability field associated with the sharer in the author rating table. The desirability for the sharer is stored in memory 1906 by the processor 1905 and execution continues at step 225.

At step 215, the processor 1905 initialises the desirability associated with the sharer, who transmitted the PUBLICATION message, to a value between zero and one. The desirability for the sharer is preferably set to a default value of 0.25 at step 215, and then stored in memory 1906. Next, at step 220, the author rating table is updated so that the desirability field for the sharer is set to the default value. Following step 220, execution continues at step 225.

At the next step 225, a total demand curve or demand curve is initialised to be uniformly zero. Next, at step 230, a total supply curve is initialised to be equal to a capacity curve for the peer being operated by the sharer who transmitted the PUBLICATION message. The total supply curve for the peer is initialised in this manner, since this peer is presumed to be the only peer connected to the network 1920 that has the image stored thereon.

Following step 230, a loop is executed in order to consider all of the sharers in the list of recipients associated with the image associated with the PUBLICATION message (i.e., the published image). During execution of the loop following step 230, individual supply and demand estimates, associated with each of the peers being used by the sharers, are summed. The summed individual supply and demand estimates are used to generate total supply and demand estimates for the image associated with the PUBLICATION message.

At step 235, if the processor 1905 determines that there is a sharer whose demand and supply for the image has not been estimated and considered, then execution continues at step 240. Otherwise, execution continues at step 175 of the method 100. At step 240, the processor 1905 determines the supply and demand for the image, by the sharer determined at step 235, over the next week. In executing step 235, the processor 1905 assumes that the sharer does not currently have the image associated with the PUBLICATION message stored thereon. A method 300 of estimating the supply and demand for an image by a particular peer, as executed at step 240, will be described in more detail below with reference to FIG. 3. At the next step 245, the supply and demand curves for the peer determined at step 240 are added to the total demand and supply curves. Following step 245 execution returns to step 235.

Figure 3:
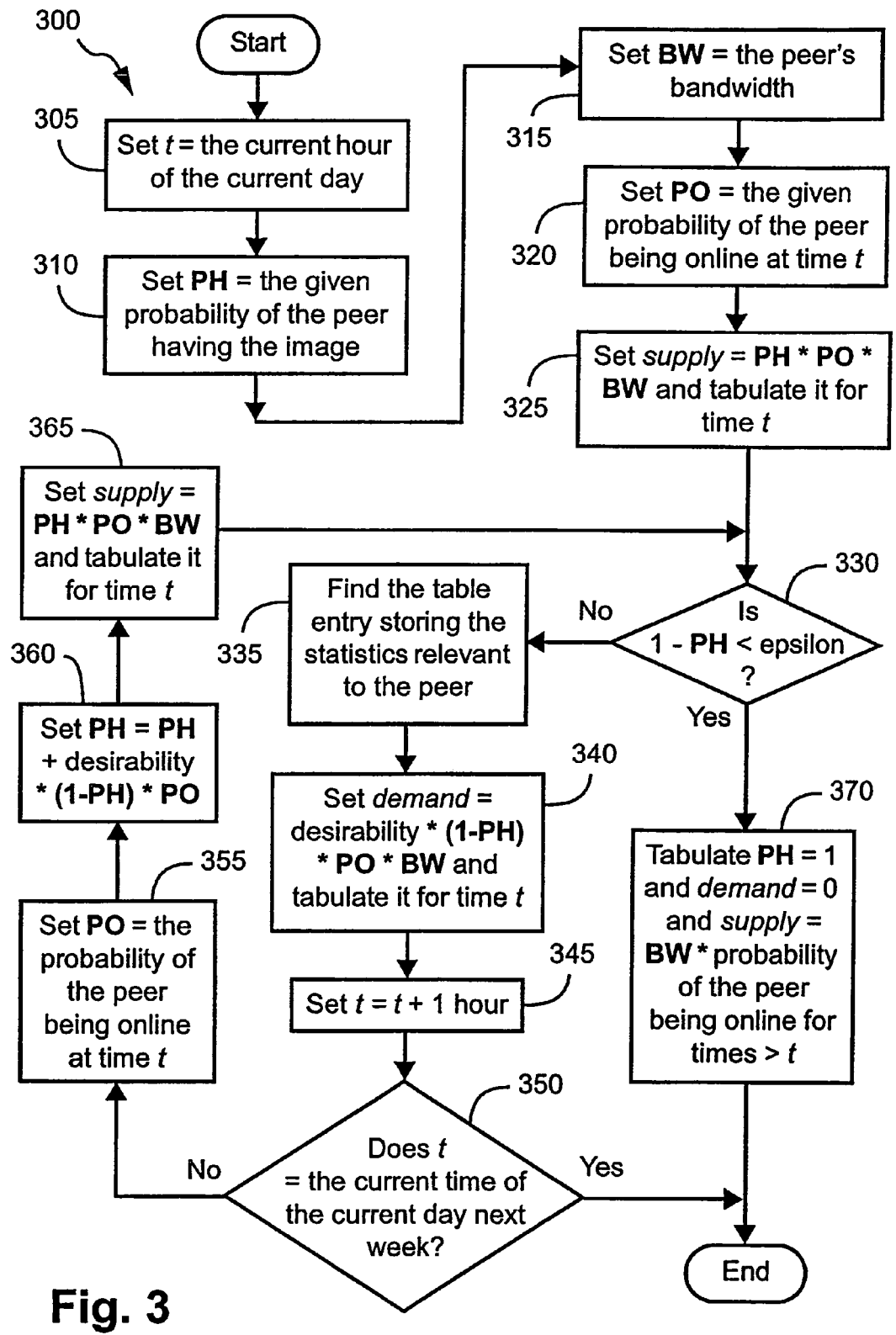
FIG. 3 is a flow diagram showing a further method of estimating supply and demand for an image.

The method 300 of estimating the supply and demand for an image by a particular peer, as executed at step 240, will now be described with reference to FIG. 3. As described above, a peer with greater capacity may require more proactive caching. However, as estimated demand for an image is realized, a peer with greater capacity can better satisfy demand from other peers, reducing the amount of proactive caching required to meet demand for the image.

The method 300 of estimating the supply and demand for an image of a given desirability by a particular peer is preferably implemented as software resident on the hard disk drive 1910 of the MES 1901 and being controlled in its execution by the processor 1905. The method 300 begins at step 305, where a variable t configured within memory 1906 is set to a value representing a current time of the day for a current day of the week. The value t representing the current time may be determined based on a system clock (not shown) configured within the MES 1901. At the next step 310, a variable PH is set to the probability that the particular peer currently has the image stored on the peer. The variable PH is therefore set to "1" after a download of the image to the peer or "0" otherwise. Then at the next step 315, a variable BW configured within memory 1906 is set to the estimated maximum bandwidth available for the peer. The method 300 then continues at step 320, where a variable PO is set to a value representing the probability of the peer being online at the current time. The variable PO is therefore set to "one" if the peer is currently online or the variable PO is set to a "zero" if the peer is not currently online. At the next step 325, a variable supply, representing the supply of an image by the peer being operated by the sharer, is set to the value of (PH*PO*BW).

Following step 325, a loop is executed by the processor 1905 so as to determine the value of supply over all of the hours of the next week. In this regard, as time passes, a peer generally becomes more likely to have a copy of an image stored on the peer. As the chance of a peer possessing an image approaches certainty, the variable PH representing the probability that the peer associated with a sharer currently has the image stored thereon, approaches the value "1".

In executing the loop following step 325, the processor 1905 utilises a parameter epsilon to determine how close a probability must be to zero before the probability is treated as being zero. The value of epsilon is preferably set to "0.001".

At step 330, if the processor 1905 determines that "1−PH<epsilon" then execution proceeds to step 370. Otherwise, execution continues at step 335. At step 335, the processor 1905 accesses a table entry of the author table, configured within memory 1906, storing the desirability parameter in the desirability field associated with the peer. Then at the next step 340, the processor 1905 sets a variable demand equal to the value of (desirability*(1−PH)*PO*BW) and tabulates the variable at time t. The variable demand represents an estimate of the probability that the peer will want to download the image at the current time (i.e., represented by the variable t) multiplied by the bandwidth available to the peer. At the next step 345, the processor 1905 increments the variable t by one hour.

The method 300 continues at the next step 350, where the processor 1905 determines if t represents the current time of day for a corresponding day next week. For example, if the current time and current day is 4:00 PM Wednesday, then the processor 1905 determines at step 350 whether the variable t is equal to 4:00 PM Wednesday of the following week. If so, execution of the method 300 concludes. Otherwise, execution continues at step 355.

At step 355, the processor 1905 sets the variable PO to a tabulated value representing the probability of the peer being online at time t. The tabulated probability values are configured within memory 1906. Then at the next step 360, the processor 1905 sets the variable PH to a value equal to (PH+desirability*(1−PH)*PO). Therefore, the new value of PH represents the probability that the peer already has the image stored thereon, added to an estimate of the probability that the peer has downloaded the image at the previous time t. Then at the next step 365, the processor 1905 updates the variable supply according to the new values for PH, PO and BW. Therefore the new value for supply represents an estimate of the peer having the image stored thereon and being online, multiplied by the bandwidth available to the peer. The value for supply is tabulated within memory 1906 as the supply for the peer at time t. Following step 365, execution returns to step 330.

At step 370, the processor 1905 sets the variable demand to "0". Further, the variable supply is set equal to the value (BW*the probability of the peer being online for the rest of the week after the current hour of the current day). Following step 370, execution concludes.

Figure 4:
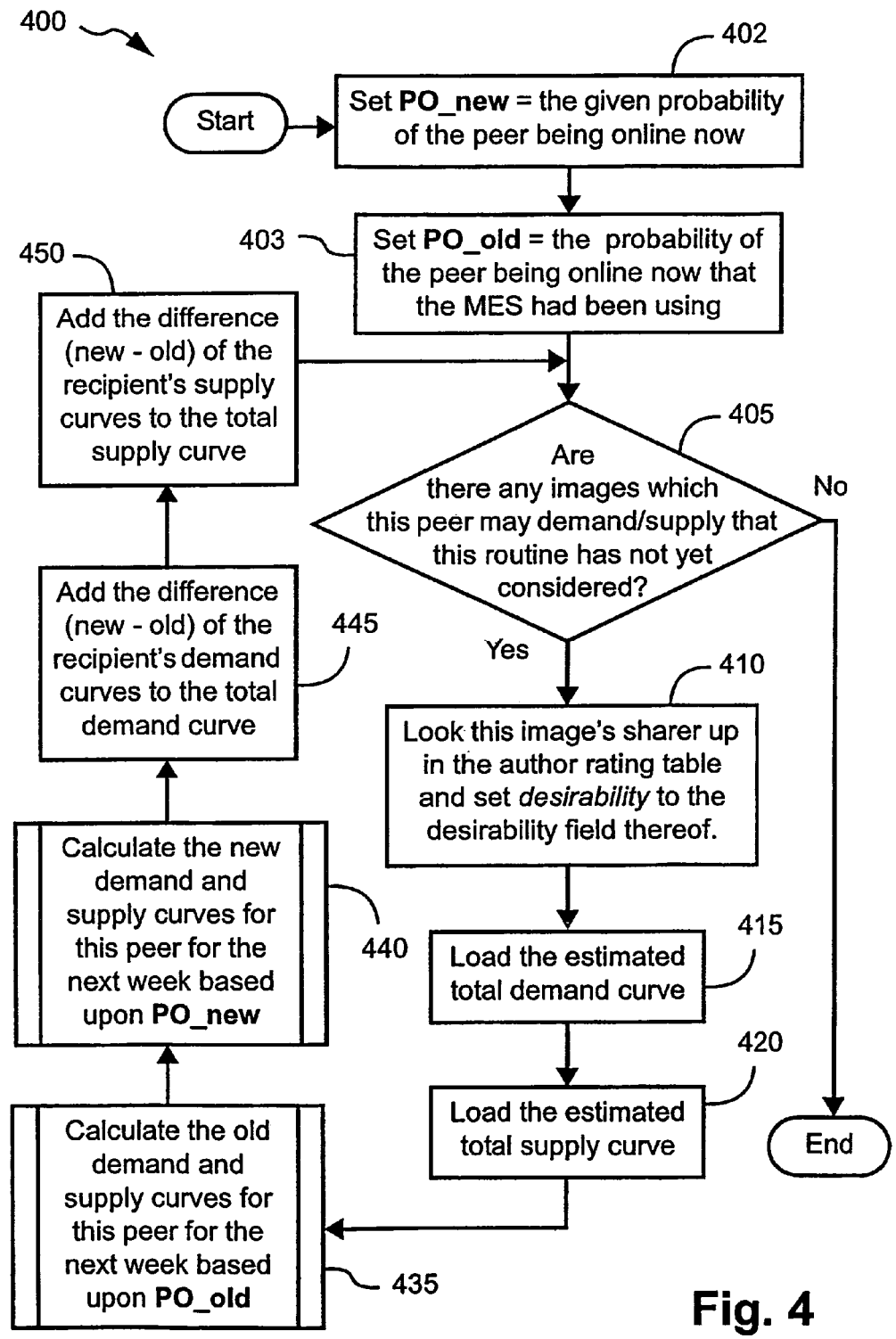
FIG. 4 is a flow diagram showing a method of refining supply and demand estimates for an image.

The method 400 of refining the supply and demand estimates for an image, as executed at steps 130 and 140, will now be described with reference to FIG. 4. The method 400 examines all images that the peer that logged into or out of the network 1920 at step 125, hereinafter referred to as the "LOGIN peer", may demand or supply. The method 400 then updates the total demand and total supply for each of the images. The method 400 of refining supply and demand estimates for an image is preferably implemented as software resident on the hard disk drive 1910 of the MES 1901 and being controlled in its execution by the processor 1905.

The method 400 begins at step 402, where the MES 1901 sets a variable PO_new equal to the probability of the LOGIN peer being online at the current time (i.e., "1" after login, "0" after logout or disappearance of the peer). Then at the next step 403, the processor 1905 sets a variable PO_old equal to the probability of a peer, being previously used by the processor 1905, being online at the current time.

At the next step 405, if the processor 1905 determines that there are any images which the LOGIN peer may demand or supply and which have not yet been considered, then execution proceeds to step 410. Otherwise, execution of the method 400 concludes.

At the next step 410, the processor 1905 sets the desirability parameter to the desirability field associated with the author of the image in the author rating table. Then at the next step 415, the processor 1905 loads the current estimated total demand curve for a current image. The method 400 continues at the next step 420, where the processor 1905 loads the current estimated total supply curve for the current image. Next, at step 435, the processor 1905 determines old demand and supply curves for the LOGIN peer over the next week based upon the previous estimates of the LOGIN peer being online at the current time t. The method 400 continues at the next step 440, where the processor 1905 determines new demand and supply curves for the LOGIN peer over the next week based upon the current known probability of the LOGIN peer being online (i.e., 1 after a LOGIN message, 0 after a LOGOUT message). The supply and demand curves are determined at steps 435 and 440 in accordance with the method 300, as described above.

At the next step 445, the processor 1905 determines the difference between new and old demand curves for the LOGIN peer and adds the difference to the total demand curve for the image by performing arithmetic on corresponding table entries. Next, at step 450 the processor 1905 determines the difference between the new and old supply curves and adds the difference to the total supply curve by performing arithmetic on corresponding table entries. Execution of the method 400 then returns to step 405 until all of the images which the LOGIN peer may demand/supply have been considered.

Figure 5:
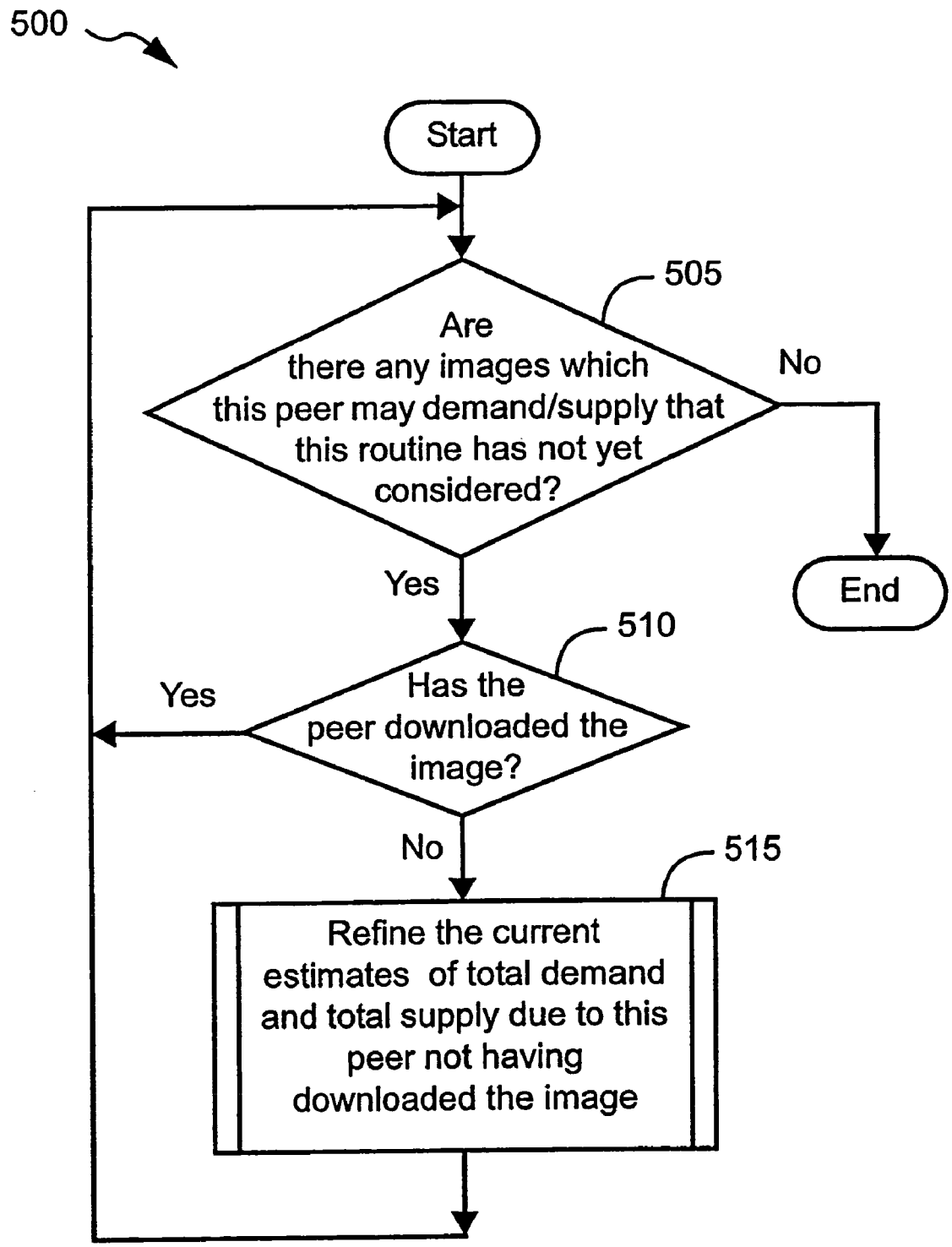
FIG. 5 is a flow diagram showing a method of refining estimates of total supply and total demand for one or more images.

The method 500 of refining estimates of total supply and total demand for one or more images, due to the presence or absence of an image on a particular peer, as executed at step 150, will now be described with reference to FIG. 5. The method 500 is preferably implemented as software resident on the hard disk drive 1910 of the MES 1901 and being controlled in its execution by the processor 1905.

The method 500 begins at step 505, where if the processor 1905 determines that there are any images that have been shared with the peer that transmitted the LOGOUT message (hereinafter the "LOGOUT peer"), at step 125, and which have not yet been considered, then execution continues at step 510. Otherwise, execution of the method 500 concludes. At the next step 510, if the processor 1905 determines that the LOGOUT peer has downloaded a current image then execution returns to step 505. Otherwise, execution proceeds to step 515, where the processor 1905 refines the estimates of total demand and total supply for the current image due to the LOGOUT peer not having downloaded the image. The total supply and demand estimates for the current image are refined in accordance with the method 1400. Following step 515, execution returns to step 505 such that all images that the LOGOUT peer may demand or supply may be processed.

Figure 10:
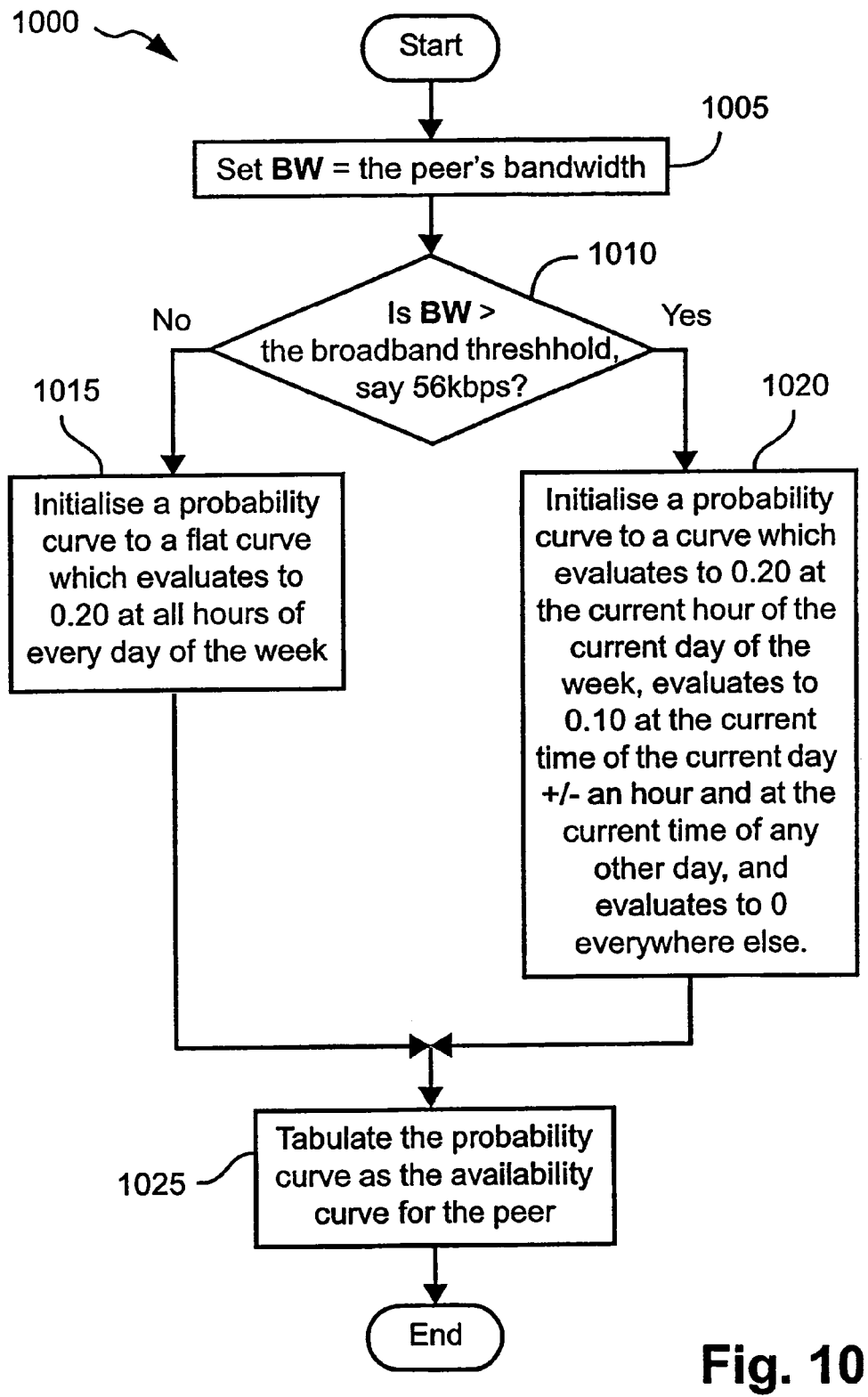
FIG. 10 is a flow diagram showing a method of estimating the availability of a peer.

A method 1000 of estimating the availability of a peer, as executed at step 180, in response to a REGISTRATION message, will now be described with reference to FIG. 10. The method 1000 is preferably implemented as software resident on the hard disk drive 1910 of the MES 1901 and being controlled in its execution by the processor 1905. The method 1000 begins at step 1005, where the processor 1905 sets the variable BW to the bandwidth of the peer that transmitted the REGISTRATION message (hereinafter referred to as the "REGISTRATION peer"), at step 125. At step 1010, if the processor 1905 determines that the value of BW is greater than a predetermined threshold (e.g., 56 kbps), then the processor 1905 assumes that the peer has a broadband connection to the network 1920. As a result, the processor 1905 also assumes that the peer is equally likely to be online at any time of day or night, any day of the week, and execution continues at step 1015.

If the value of BW is less than or equal to the predetermined threshold, then the processor 1905 assumes that the peer is on a dialup modem connection. In this instance, the processor 1905 assumes that the peer is most likely to be online around the time that registration first occurred, and execution continues at step 1020.

At step 1015, the processor 1905 initialises a probability curve to a flat curve of predetermined amplitude, for example, 0.20. In this instance, the probability that the REGISTRATION peer will be online at any time of day, any day of the week, is 0.20. Such a probability has been selected in order to balance a risk that a sharer may not log in as often as expected against a risk that the sharer may log in more often than expected. In the first instance, the REGISTRATION peer may be used to cache data from other peers and to provide less supply than expected. In the second instance (i.e., that the user logs in more often than expected), the MES 1901 may not provide sufficient proactive caching on other peers connected to the network 1920 in order to satisfy the demand for an image by the REGISTRATION peer.

At step 1020, a probability curve is initialised to a predetermined probability (e.g., 0.20) at the current time t of the current day, to a further predetermined probability (e.g., 0.10) at the current time of the current day+/−an hour and at the current time of any other day of the week, and to a further predetermined probability (e.g., 0.00) everywhere else.

Following steps 1015 or 1020, execution proceeds to step 1025, where the processor 1905 tabulates the probability curve as the availability curve pertaining to the REGISTRATION peer that will be used to predict when the REGISTRATION peer is likely to be online. Execution continues at step 185 of the method 100 following step 1025.

Figure 11A:
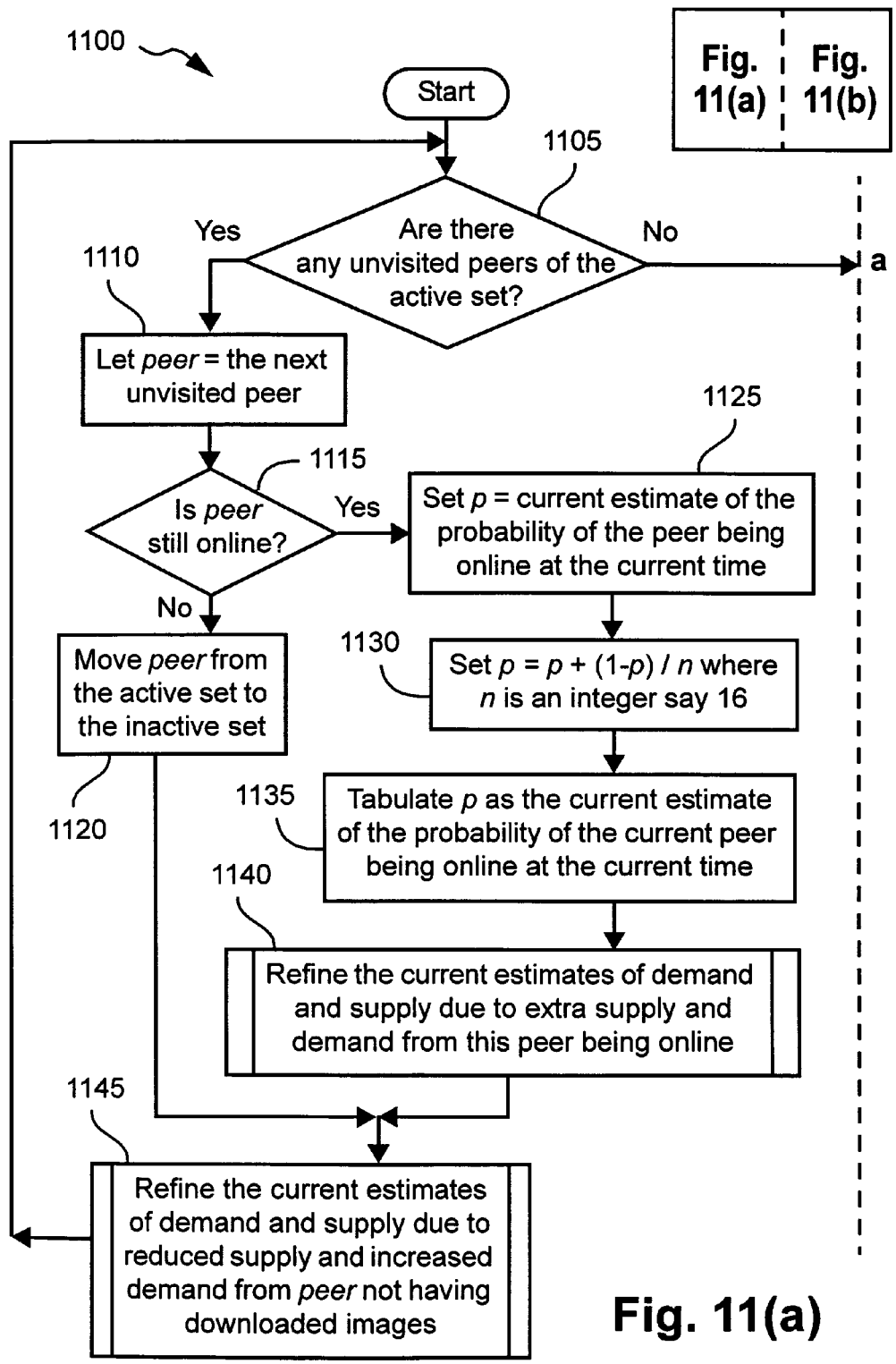
FIG. 11 is a flow diagram showing a further method of refining supply and demand estimates.
Figure 11B:
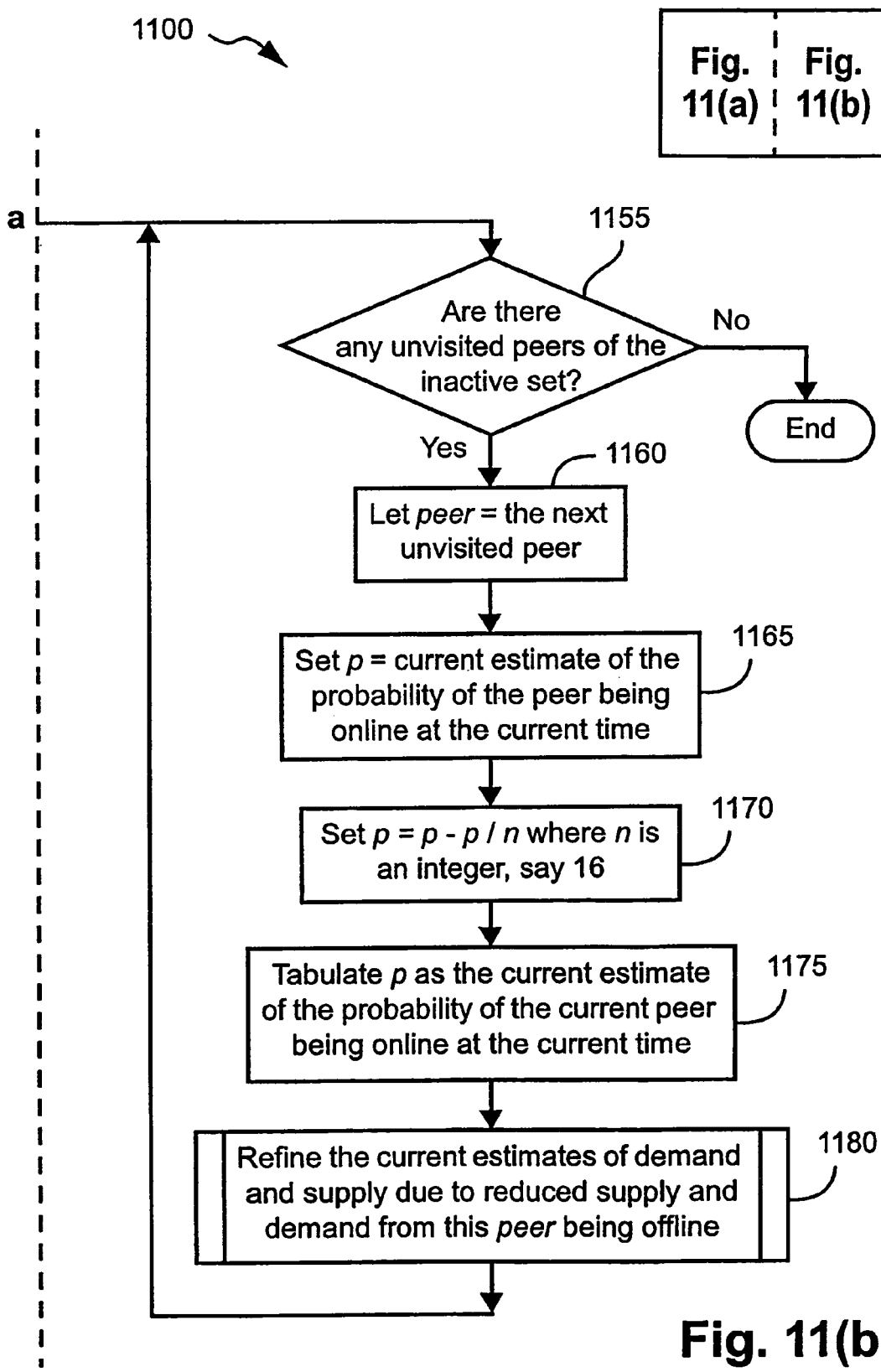

The method 1100 of refining supply and demand estimates, as executed at step 115, will now be described with reference to FIG. 11. The method 1100 refines any previously determined supply and demand estimates, associated with one or more images published over the network 1920, depending on the availability of peers which are connected to the network 1920. The method 1100 replaces the previously determined estimates of the availability of peers with established probabilities. Such established probabilities are determined by examining the active and inactive sets of peers and confirming that peers in the active set remain online. The method 1100 is preferably implemented as software resident on the hard disk drive 1910 of the MES 1901 and being controlled in its execution by the processor 1905.

The method 1100 begins at the first step 1105, where the processor 1905 determines whether there are any peers in the active set that have not been processed. If there are any peers in the active set to be processed then execution continues at step 1110. Otherwise, execution continues at step 1155. At step 1110, the processor 1905 sets a pointer labeled peer to point to a next unvisited peer in the active set. At the next step 1115, the processor 1905 determines whether peer is still online. If peer is not still online, then execution continues at step 1120. Otherwise, execution continues at step 1125.

At step 1120, the processor 1905 moves peer from the active set to the inactive set. That is, the processor 1905 removes an identifier corresponding to peer from the active set to the inactive set and execution continues thereafter at step 1145.

Steps 1125 to 1135 update the availability curve of the peer being identified by peer by adjusting the probability of peer being online at the current time, t. The process of steps 1125 to 1135 do not attempt to make an accurate estimate of the probability of peer being online at the current time, t, rather the process attempts to ensure reasonable asymptotic convergence to a true value representing the probability.

At step 1125, the processor 1905 sets a variable p to a current estimate of the probability of peer being online at the current time, t (i.e., current hour of current day of week). Next, at step 1130, the processor 1905 sets $p=p+(1-p)/n$, where n is a predetermined integer constant (e.g., 16). Then at step 1135, the processor 1905 tabulates the new value of p as the probability of peer being online at the current time. At the next step 1140, the processor 1905 refines the current estimates of total supply and total demand for one or more images published on the network 1920 due to extra supply and demand from peer. The current estimates of total supply and total demand are refined at step 1140 in accordance with the method 400.

The method 1100 continues at the next step 1145, where the processor 1905 refines capacity estimates for peer due to the presence or absence of one or more particular images on peer, in accordance with the method 500. If the processor 1905 determines that peer has downloaded a particular image, then the download message, DOWNLOAD, may have already caused the probability of peer having the particular image being stored thereon to be adjusted accordingly. Following step 1145, execution returns to step 1105.

After the processor 1905 has finished looping over the active set of peers, during steps 1105 to 1145, the processor 1905 loops over the inactive set of peers, refining estimates of supply and demand for one or more images accordingly.

At step 1155, if the processor 1905 determines that there are any peers in the inactive set that have not been visited in the current traversal, then execution continues at step 1160. Otherwise, execution continues at step 120 of the method 100. At step 1160, the processor 1905 sets the pointer, peer, to point to a next unvisited peer in the inactive set and execution continues thereafter at step 1165.

Steps 1165 to 1175 update the availability curve corresponding to peer adjusting the probability of peer being online at the current time. At step 1165, the processor 1905 sets p equal to a current estimate of the probability of peer being online at the current time. Then, at step 1170, the MES sets $p=p-p/n$, where n is the same predetermined integer constant used in step 1130 (e.g., 16). At the next step 1175, the processor 1905 tabulates the new value of p as the probability of peer being online at the current time.

The method 1100 continues at the next step 1180, where the processor 1905 refines the current estimates of total supply and total demand for one or more images due to reduced supply and demand from peer, in accordance with the method 400. Following step 1180, execution continues thereafter at step 1155 to process the next peer of the inactive set.

Figure 12:
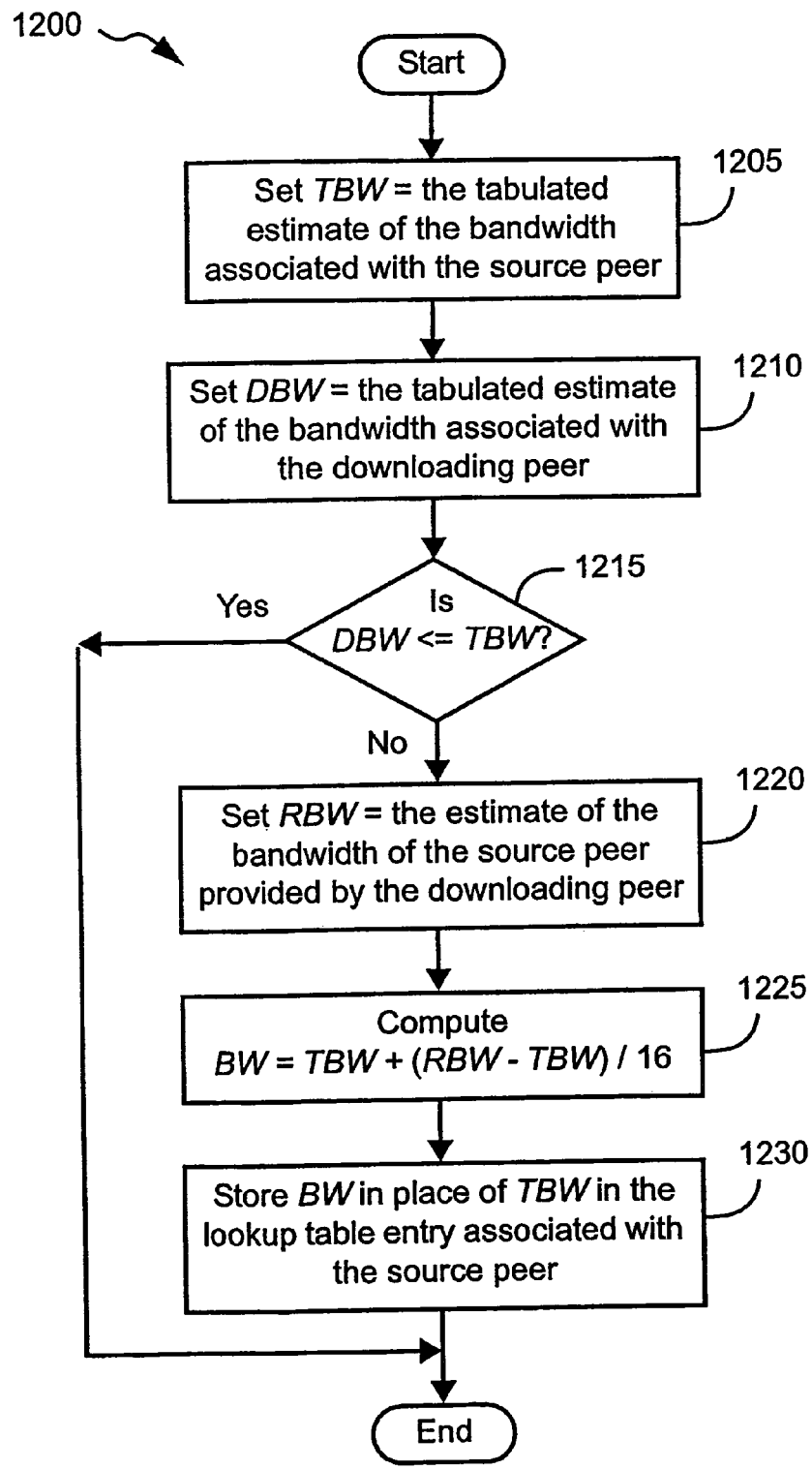
FIG. 12 is a flow diagram showing a method of modifying capacity estimates for peers based upon information from another peer.

The method 1200 of modifying capacity estimates for a peer based upon information from another peer, as executed at step 170, will now be described with reference to FIG. 12.

The method 1200 updates the estimate of bandwidth for a peer after another peer downloads an image from the peer. If a peer has extra bandwidth but does not use the bandwidth either to upload or download images, then the method 1200 may not detect the extra bandwidth. However, a peer whose bandwidth increases will be discovered using the method 1200.

The peer having the extra bandwidth may be "blacklisted" to discourage underestimation of capacity by that peer or any other peers. However, instead of blacklisting such a peer, the method 1200 restores symbiosis by updating the estimate of bandwidth and capacity for the system 1900.

The method 1200 is preferably implemented as software resident on the hard disk drive 1910 of the MES 1901 and being controlled in its execution by the processor 1905. The method 1200 begins at step 1205, where the processor 1905 sets a variable TBW equal to a tabulated bandwidth corresponding to the peer from which the image, requested by the DOWNLOAD message, was downloaded. This peer will hereinafter be referred to as the "source peer". Therefore, the variable TBW now represents the amount of bandwidth that the processor 1905 currently believes the source peer has.

At the next step 1210, the processor 1905 sets a variable DBW equal to a tabulated bandwidth of the peer that transmitted the DOWNLOAD message. This peer will hereinafter be referred to as the "DOWNLOAD peer". Then at step 1215, if the processor 1905 determines that the value of DBW is less than or equal to the value of TBW, then execution of the method 1200 concludes. Otherwise, execution continues at step 1220.

At step 1220, the processor 1905 sets a variable RBW equal to the bandwidth of the source peer, as determined by the downloading peer. Then at the next step 1225, the processor 1905 determines a new asymptotic estimate for the bandwidth of the source peer, in accordance with the following formula:

$$BW=TBW+(RBW-TBW)/m,$$

where m is a predetermined integer constant (e.g., 16).

At the next step 1230, the new bandwidth estimate BW determined at step 1225, is stored in place of TBW in a lookup table entry associated with the source peer and execution continues at step 175.

Figure 13:
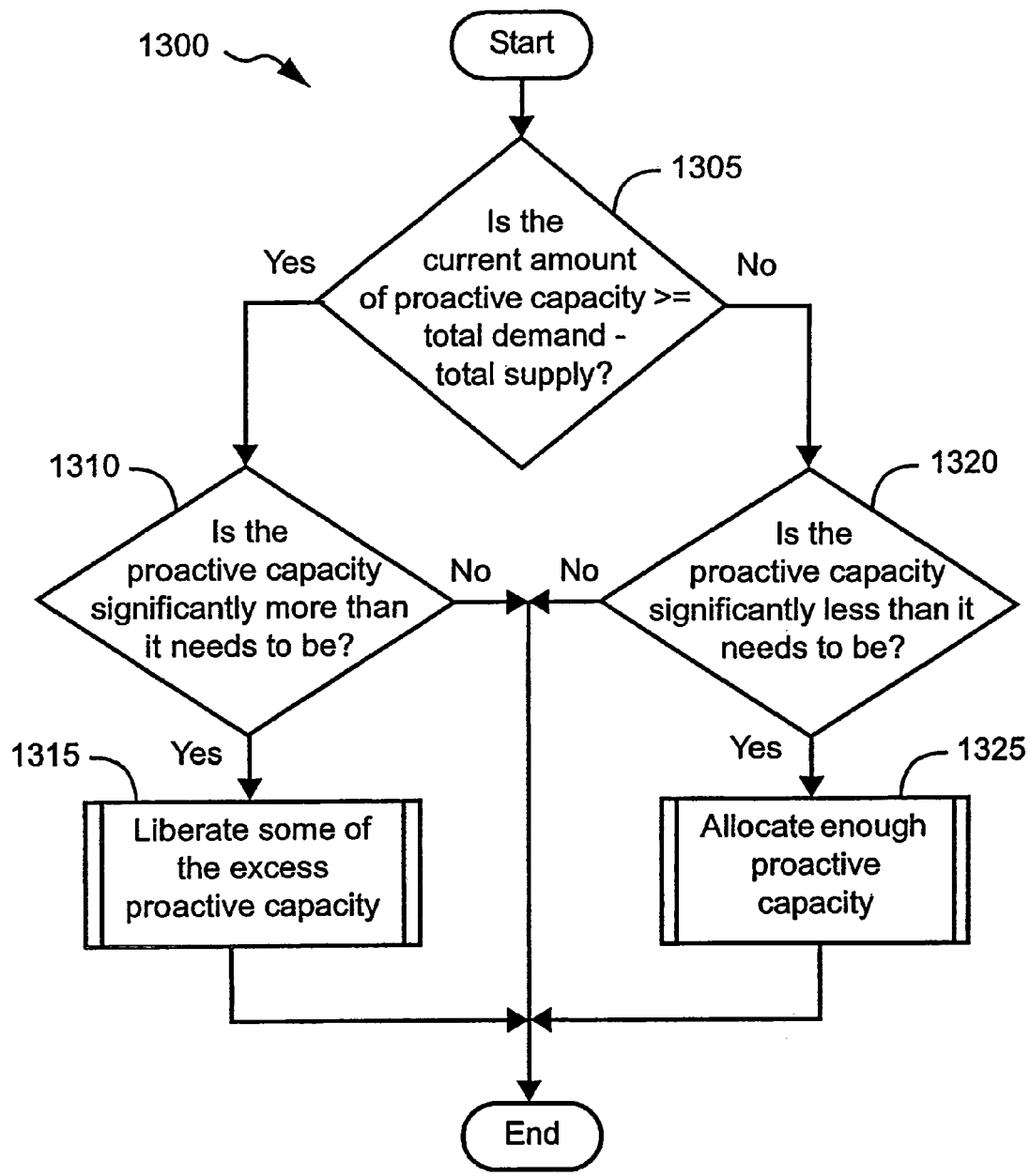
FIG. 13 is a flow diagram showing a method of modifying proactive storage for an image.

The method 1300 of modifying the proactive storage for an image, as executed at step 175, will now be described with reference to FIG. 13. The method 1300 is preferably implemented as software resident on the hard disk drive 1910 of the MES 1901 and being controlled in its execution by the processor 1905.

The method 1300 begins at step 1305, where the processor 1905 determines whether a current amount of proactive storage capacity for the image is greater than or equal to the result of subtracting the current total supply for image from the current total demand for the image. The proactive storage capacity for an image is determined as the sum of capacity curves for all peers that have been instructed by the MES 1901 to upload the image. If the current amount of proactive storage capacity for the image is greater, at step 1305, then execution continues at step 1310. Otherwise, the execution continues at step 1320.

At step 1310, the processor 1905 determines whether the proactive storage capacity for the image is significantly greater than necessary. The determination is made at step 1310 by determining whether the proactive storage capacity for the image is greater than "1.2*(demand−supply)" at a minimum point of proactive capacity for the image in the next week. If the proactive storage capacity for the image is greater than necessary at step 1310, then execution continues at step 1315. Otherwise, execution of the method 1300 concludes.

At step 1315, the processor 1905 releases some of the excess proactive storage capacity. A method 600 of releasing excess proactive storage capacity, as executed at step 1315, will be described in detail below with reference to FIG. 6. Following step 1315, execution concludes.

At step 1320, the processor 1905 determines whether the proactive storage capacity for the image is significantly less than necessary. The determination is made at step 1320 by determining if the proactive storage capacity for the image is less than "0.9*(demand−supply)" at a minimum point of capacity for the image during the next week. If the proactive storage capacity is greater than necessary at step 1320, then execution continues at step 1325. Otherwise, execution concludes. A method 700 of allocating memory in order to increase proactive storage capacity, as executed at step 1325, will be described in detail below with reference to FIG. 7.

Figure 6:
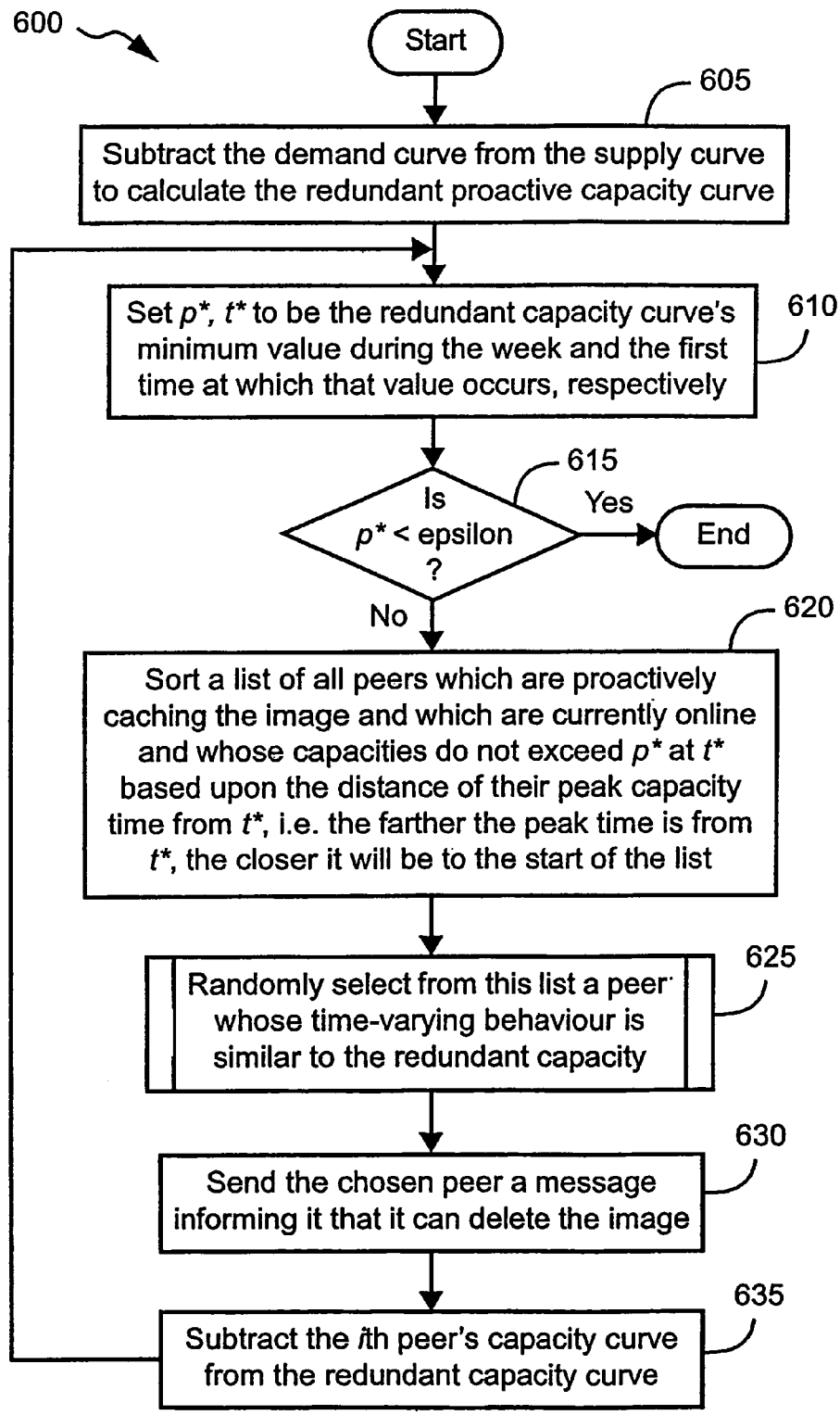
FIG. 6 is a flow diagram showing a method of releasing excess proactive storage capacity.

The method 600 of releasing excess proactive storage capacity, as executed at step 1315, will now be described with reference to FIG. 6. The method 600 is preferably implemented as software resident on the hard disk drive 1910 of the MES 1901 and being controlled in its execution by the processor 1905.

The method 600 begins at step 605, where the processor 1905 determines a redundant proactive storage capacity curve for the image associated with the PUBLICATION message or the DOWNLOAD message, by subtracting the demand curve of the image from the supply curve for the image. At the next step 610, the processor 1905 sets variables p* and t* to the minimum value for redundant capacity during the next week and the earliest time at which this minimum value occurs, respectively.

At the next step 615, the processor 1905 determines whether p* is less than epsilon and is therefore small enough to be regarded as insignificant. In this instance, epsilon is selected to be positive yet almost zero (e.g., 0.01*3 Mbps). If p* is less than epsilon, at step 615, then execution terminates. Otherwise, execution continues at step 620.

At step 620, the processor 1905 sorts a list of all peers proactively caching the image which are currently online and whose capacities at time t* do not exceed p*. The determination is made at step 620 based upon the distance (i.e., in time) from a peak capacity for a peer to the value t*, such that the farther a peak capacity for a peer is from t*, the closer a peer will be to the start of the list.

At the next step 625, the processor 1905 selects from the list of peers, a peer having capacity which varies with time in a similar manner to the redundant proactive storage capacity curve for the image as determined at step 605. A method of selecting a peer having a capacity which varies in a similar manner to a given capacity curve, as executed at step 625, will be described in detail below with reference to FIG. 8.

The method 600 continues at the next step 630, where the processor 1905 sends a message to the peer selected at step 625 informing the peer that it can delete the image associated with the DOWNLOAD or PUBLICATION message. Then at the next step 635, the processor 1905 subtracts the capacity curve for the selected peer from the redundant capacity curve as determined at step 605. Following step 635, execution returns to step 610.

Figure 7:
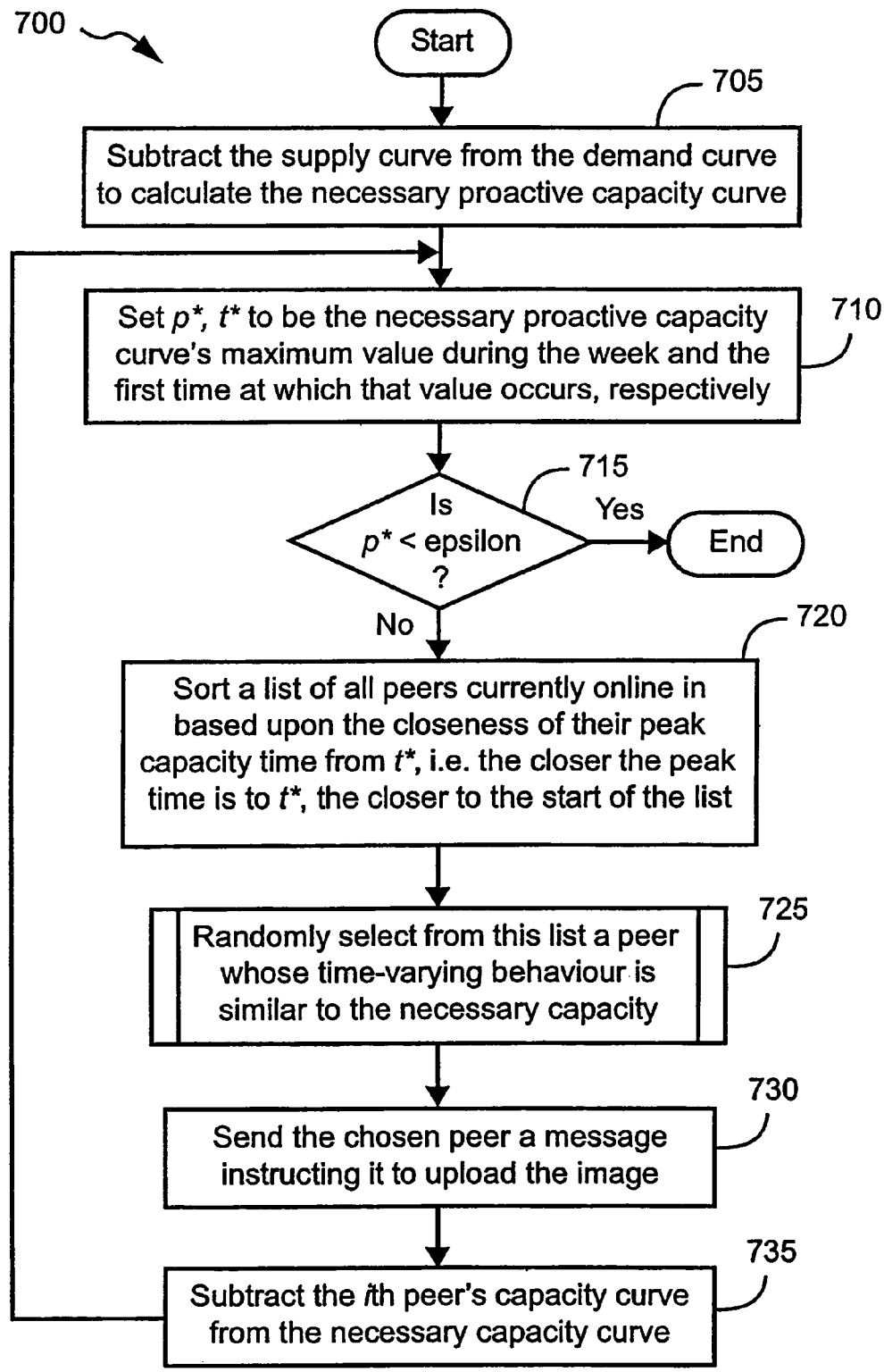
FIG. 7 is a flow diagram showing a method of allocating memory in order to increase proactive storage capacity.

The method 700 of allocating memory in order to increase proactive storage capacity, as executed at step 1325, will now be described in more detail with reference to FIG. 7. The method 700 is preferably implemented as software resident on the hard disk drive 1910 of the MES 1901 and being controlled in its execution by the processor 1905. The method 700 allocates proactive storage capacity for an image, while balancing the load between more and less capable peers. The method 700 is stochastic in nature so as to remove the need to record precise details of the current load for every peer.

The method 700 begins at step 705, where the processor 1905 determines the necessary capacity curve for the image, associated with the PUBLICATION or DOWNLOAD message transmitted at step 125, by subtracting the supply curve for the image from the demand curve for the image. Then at the next step 710, the MES sets the variables p* and t* to the maximum value for necessary capacity during the next week and the earliest time at which this maximum value occurs, respectively. At the next step 715, the processor 1905 determines whether p* is less than epsilon and is therefore small enough to be regarded as insignificant. Again, in this instance, epsilon is selected to be positive yet almost zero (e.g., 0.01*3 Mbps). If p* is less than epsilon, at step 715, then execution terminates. Otherwise, execution continues at step 720.

At step 720, the processor 1905 sorts a list of all peers which are currently online and whose capacities at time t* do not exceed p*. Again, the determination is made at step 720 based upon the distance (i.e., in time) from a peak capacity for a peer to the value t*, such that the farther a peak capacity for a peer is from t*, the closer a peer will be to the start of the list.

At the next step 725, the processor 1905 selects from the list of peers, a peer having capacity which varies with time in a similar manner to the necessary capacity curve for the image as determined at step 705. The peer is selected at step 725 in accordance with the method 800.

The method 700 continues at the next step 730, where the processor 1905 sends a message to the peer selected at step 725 informing the peer to upload the image associated with the DOWNLOAD or PUBLICATION message. Then at the next step 735, the processor 1905 subtracts the capacity curve for the selected peer from the necessary curve as determined at step 705. Following step 735, execution returns to step 710.

Figure 8:
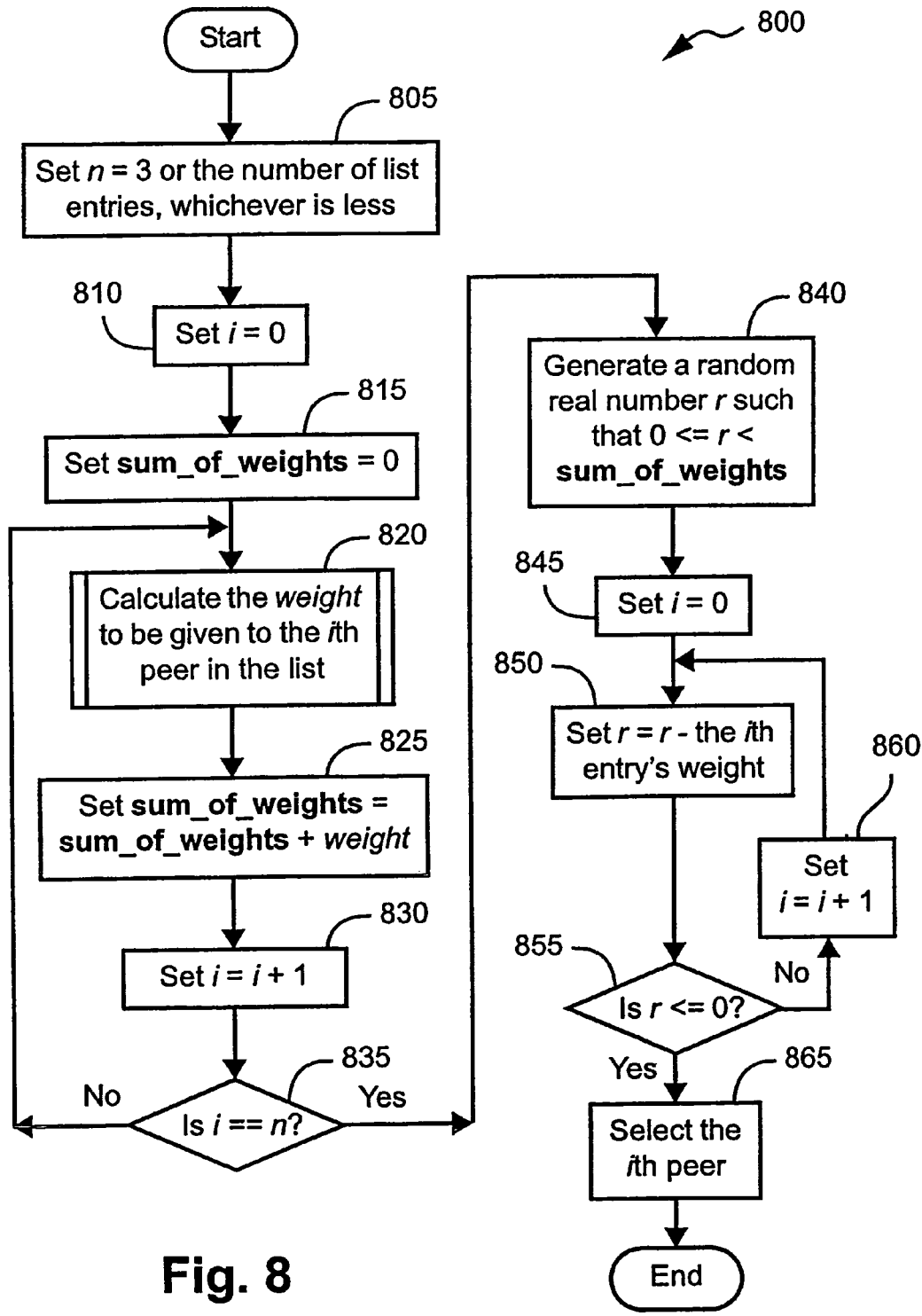
FIG. 8 is a flow diagram showing a method of selecting a peer having a capacity which varies in a similar manner to a given capacity curve.

The method 800 of selecting from a list of peers, a peer having a capacity which varies in a similar manner to a given capacity curve, as executed at steps 625 and 725, will now be described with reference to FIG. 8. The method 800 is preferably implemented as software resident on the hard disk drive 1910 of the MES 1901 and being controlled in its execution by the processor 1905.

The method 800 begins at step 805, where the processor 1905 sets a variable n to the minimum of the numbers three and the number of entries in a list of peers. At the next step 810, the processor 1905 sets a counter, i, equal to zero. Then at the next step 815, a variable sum_of_weights is set equal to zero. Following step 815, the processor 1905 loops over the first n peers in the list of peers.

At the next step 820, the processor 1905 determines a weight value to be allocated to an ith peer in the list. A method of determining a weight value, as executed at step 820, will be described in more detail below with reference to FIG. 9.

The method 800 continues at the next step 825, where the variable sum_of weights is set equal to an old value of sum_of weights plus the weight value determined at step 820. Then at the next step 830, the counter i is incremented by one. If i<n at the next step 835, then execution of the method 800 returns to step 820. Otherwise, execution of the method 800 proceeds to step 840.

At step 840, the processor 1905 generates a random real number r such that, 0<=r<sum_of_weights. Then at the next step 845, the processor 1905 sets i equal to zero. The method 800 continues at the next step 845, where the processor 1905 executes a loop until the counter i indexes the peer to be selected.

At the next step 850, the processor 1905 sets the random real number, r, to the old value of r minus the weight allocated to the ith peer in the list. Then at the next step 855, if the processor 1905 determines that r>0, then execution continues at step 860. Otherwise, execution continues at step 865. At step 860, the processor 1905 increments i and execution continues thereafter at step 850.

At step 865, the processor 1905 selects the ith peer as the peer having a capacity which varies in a similar manner to the given capacity curve. Execution of the method 800 then concludes.

Figure 9:
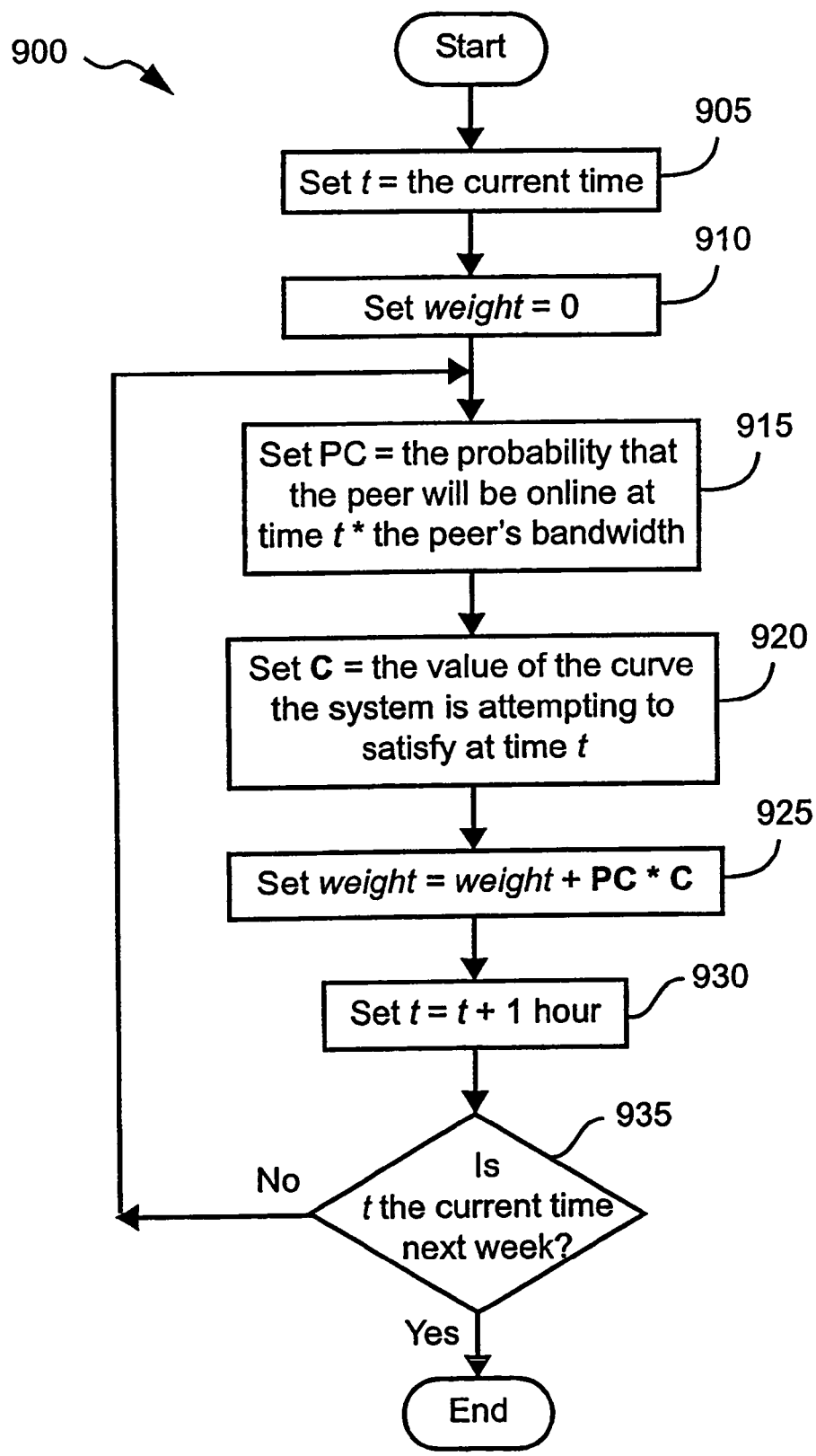
FIG. 9 is a flow diagram showing a method of determining a weight value to be allocated to a peer.

The method 900 of determining the weight of a peer to match a given capacity curve, as executed at step 820, will now be described with reference to FIG. 9. The method 900 favours peers with high bandwidth which are online when the MES 1901 expects the capacity will be needed. The method 900 is preferably implemented as software resident on the hard disk drive 1910 of the MES 1901 and being controlled in its execution by the processor 1905.

The method 900 begins at step 905, where the processor 1905 sets the variable t equal to the current time (i.e., the current hour of the current day of the week). At the next step 910, the MES 901 initialises a variable weight to zero. The processor 1905 then loops over tables representing the capacity curves over the next week, for the peer, accumulating the product of corresponding entries.

At step 915, the processor 1905 sets a variable PC equal to the capacity of the peer at time t. Therefore, the variable PC is set equal to the product of the probability of the peer being online at time t and the bandwidth of the peer. Then at the next step 920, the processor 1905 sets a variable C equal to the value at time t of the capacity curve for which the processor 1905 is attempting to find a matching peer.

The method 900 continues at the next step 925, where the processor 1905 adds the product, PC*C, to the value of the variable weight (i.e., weight=previous value of weight+ PC*C). Next, at step 930, the processor 1905 increments t by one hour. Then at the next step 935, if the processor 1905 determines that t is equal to the current time next week (i.e. the same hour and the same day next week) then execution returns to step 825 of the method 800. Otherwise, execution continues at step 915.

Figure 14:
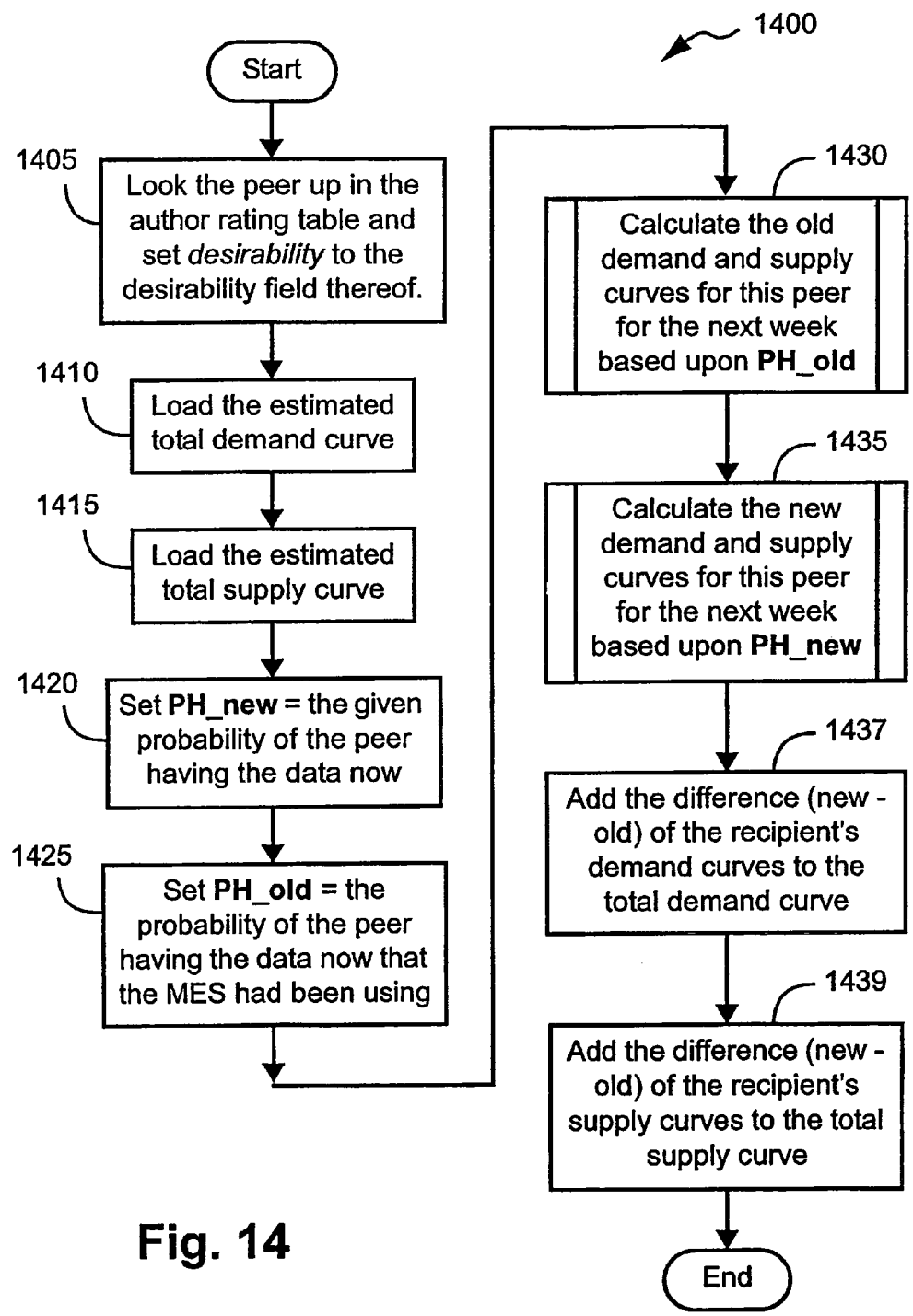
FIG. 14 is a flow diagram showing a still further method of refining supply and demand estimates for an image.

The method 1400 of refining supply and demand estimates for an image, as executed at steps 165 and 515, will be described with reference to FIG. 14. The method 1400 is preferably implemented as software resident on the hard disk drive 1910 of the MES 1901 and being controlled in its execution by the processor 1905. The method 1400 is executed in response to reduced supply and increased demand for an image from a peer which has logged out or disappeared (as at step 515), or in response to reduced demand and increased supply from a peer which has downloaded an image (as at step 165).

The method 1400 begins at step 1405, where the processor 1905 sets the desirability parameter according to the desirability field, of the author rating table, associated with the peer that logged out, disappeared or that downloaded an image. At the next step 1410, the processor 1905 loads the current estimated total demand curve for the image that was downloaded. Then at the next step 1415, the processor 1905 loads the current estimated total supply curve for the image.

The method 1400 continues at the next step 1420, where the processor 1905 sets a variable PH_new equal to a given probability of the peer having the image now (i.e. "1" after the peer has downloaded the image, "0" after the peer is established to have not downloaded the image). At the next step 1425, the processor 1905 sets a variable PH_old equal to the probability of the peer, which the MES 1901 had been using previously, having the image. Then at step 1430, the processor 1905 determines the old demand and supply curves for the peer over the next week based upon the previous estimate of the peer having the image at the current time PH_old. The supply and demand curves are determined at step 1430, in accordance with the method 300.

The method 1400 continues at the next step 1435, where the processor 1905 determines the new demand and supply curves for the peer over the next week based upon the current known probability of the peer having the image (i.e., PH_new). Again, the supply and demand curves are determined at step 1435, in accordance with the method 300. Then at the next step 1437 the processor 1905 determines the difference between the demand curves determined at steps 1430 and 1435 and adds the difference to the total demand curve by performing arithmetic on corresponding table entries.

The method 1400 concludes at the next step 1439, where the processor 1905 determines the difference of the supply curves determined at steps 1430 and 1435 and adds the difference to the total supply curve by performing arithmetic on corresponding table entries.

Figure 15:
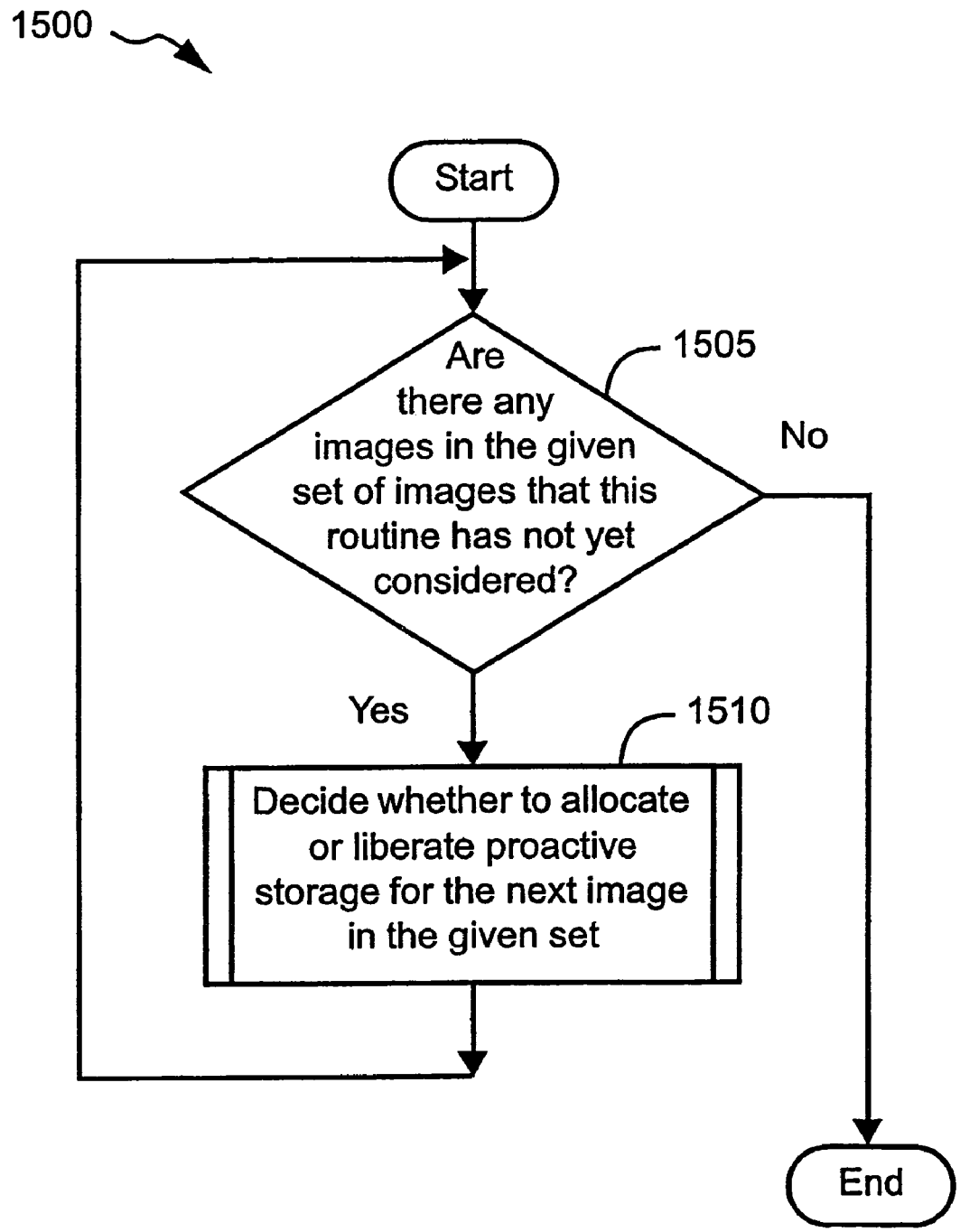
FIG. 15 is a flow diagram showing a method of adjusting the amount of proactive storage for a set of images following refinement of supply and demand estimates for the images.

The method 1500 of adjusting the amount of proactive storage for a set of images following refinement of supply and demand estimates of the images will now be described, with reference to FIG. 15. The method 1500 is preferably implemented as software resident on the hard disk drive 1910 of the MES 1901 and being controlled in its execution by the processor 1905.

In the method 1500, the MES 1901 loops over all images in the set of images, adjusting the proactive storage allocated to each of the images. The method 1500 begins at step 1505, where the processor 1905 determines whether there are any images in the set which have not yet been considered. If so, then execution continues at step 1510. Otherwise, execution of the method 1500 concludes. At step 1510, the processor 1905 adjusts the proactive storage for the current image, in accordance with the method 1300, and execution returns to step 1505.

Figure 17:
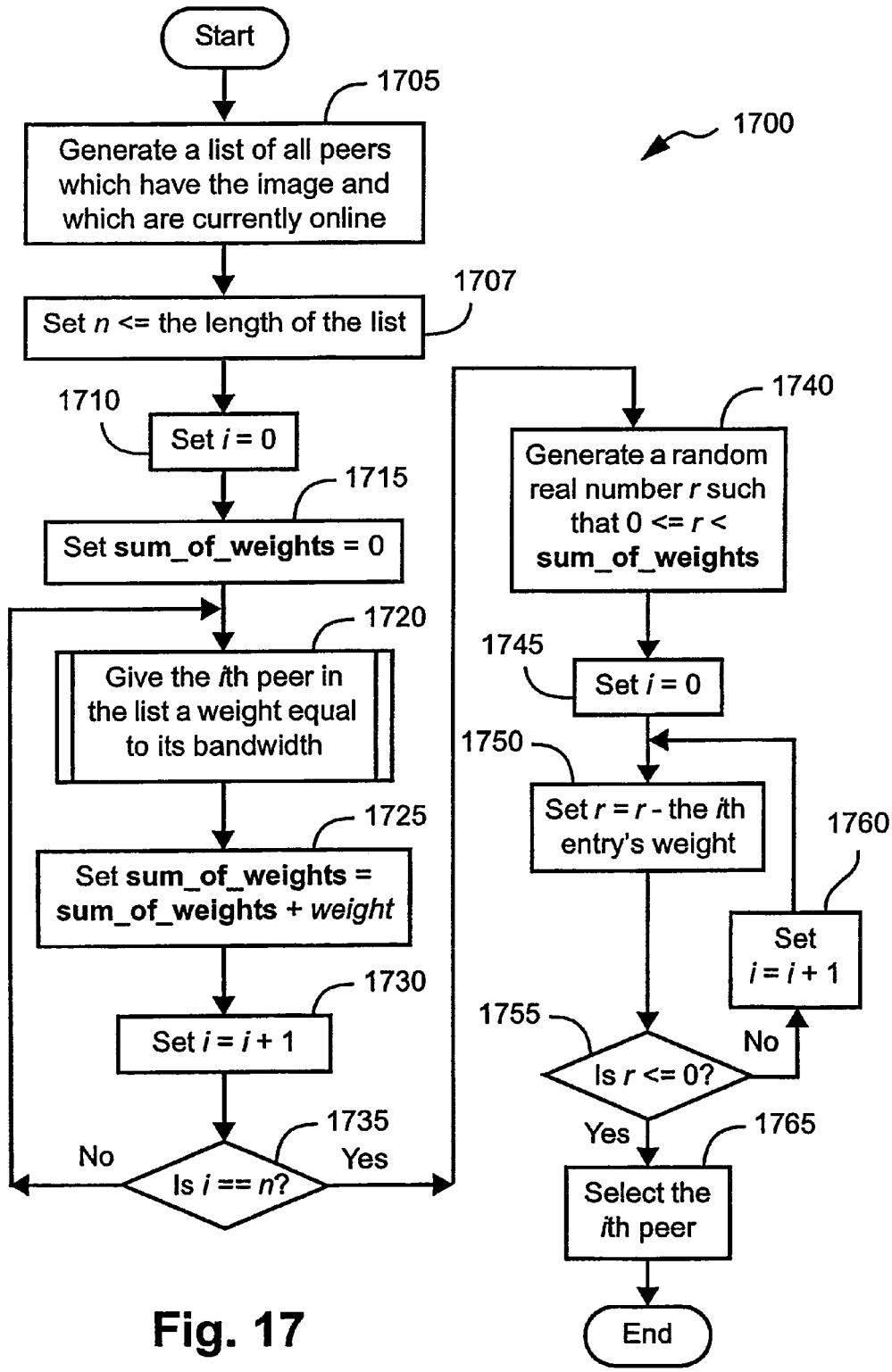
FIG. 17 is a flow diagram showing a method of selecting a peer as a source for an image requested by another peer.

The method 1700 of determining which peer is to be selected as a source for an image requested by another peer, as executed at step 190, will now be described with reference to FIG. 17. The method 1700 is preferably implemented as software resident on the hard disk drive 1910 of the MES 1901 and being controlled in its execution by the processor 1905.

The method 1700 begins at step 1705, where the processor 1905 generates a list of all peers which have the requested image stored thereon and are currently online. At the next step 1707, the processor 1905 sets a variable n to a value less than or equal to the length of the list of peers. Then at the next step 1710, the processor 1905 sets a variable i to zero. At the next step 1715, the variable, sum_of_weights, is set equal to zero.

The method 1700 continues so that the processor 1905 loops over the first n peers in the list of peers. At the next step 1720, the processor 1905 gives the ith peer in the list a weight equal to the bandwidth of the ith peer. At the next step 1725, the variable sum_of_weights is set equal to the old value of sum_of_weights plus the value of the variable weight. Then at the next step 1730, the counter i is incremented by one. If i<n at the next step 1735, then execution of the method 1700 returns to step 1720. Otherwise, execution of the method 1700 proceeds to step 1740.

At step 1740, the processor 1905 generates a random real number r such that, 0<=r<sum_of_weights. Then at the next step 1745, the processor 1905 sets i equal to zero. The method 1700 continues so that the processor 1905 executes a loop until the counter i indexes the peer to be selected.

At the next step 1750, the processor 1905 sets the random real number, r, to the old value of r minus the weight allocated to the ith in the list. Then at the next step 1755, if the processor 1905 determines that r>0, then execution continues at step 1760. Otherwise, execution continues at step 1765. At step 1760, the processor 1905 increments i and execution continues thereafter at step 1750. At step 1765, the processor 1905 selects the ith peer as the source peer for the image. Execution of the method 1700 then concludes.

A method 1800 for processing events as executed by one of more of the peers 1950, 1952 will now be described with reference to FIG. 18. A peer such as the peers 1950 and 1952 process two types of events. The first type of event is an ACTION requested by the user. The second type of event is a message from the MES 1901 or other peers (e.g., the peers 1950, 1952).

The method 1800 is preferably implemented as software resident on a hard disk drive (not shown) of a peer (e.g., the peers 1950, 1952) and being controlled in its execution by a processor (not shown) of the peer. The method 1800 begins at step 1805, where a processor of the peer awaits a next event entered via a keyboard or mouse of the peer or received over the network 1920 from another computer or peer (e.g., peers 1950, 1952) connected to the network 1920. At the next step 1810, if the peer determines that the event is an ACTION entered by the user operating the peer (e.g., the user may request that something be done), then execution proceeds to step 1815. Otherwise, if the processor of the peer detects a MESSAGE received via the network 1920 from another peer or from the MES 1901 informing the peer of something or requesting that the peer do something, then execution proceeds to step 1830.

At step 1815, the peer determines what ACTION the user has requested. If the user has requested that a datum be downloaded, then execution continues at step 1820. Otherwise, execution continues at step 1825. At step 1820, the peer downloads the datum, using the MES 1901 if necessary to find a peer which has the image. A method 1600 of downloading datum representing an image, as executed at step 1820, will be described in detail below with reference to FIG. 16. Following step 1820, execution thereafter returns to step 1805 to await the next event.

At step 1825, the peer sends a PUBLICATION message to the MES 1901 and to all peers (e.g., the peers 1950, 1952) corresponding to the sharers listed in the list of recipients. Following step 1825, execution thereafter returns to step 1805 to await the next event.

At step 1830, the processor of the peer determines what type of message has been detected. If the message is an ALLOCATE message, at step 1830, from the MES 1901 instructing the peer to upload the image (as at step 730 of the method 700), execution continues at step 1835. At step 1835, the peer uploads the image from the given source location to the local storage of the peer as requested and execution thereafter returns to step 1805 to await the next event.

If the message detected at step 1830 is a LIBERATE message from the MES 1901 instructing the peer that the peer does not need to continue caching an image (as at step 630 of the method 600), execution continues at step 1840. At step 1840, the peer deletes the image from local storage of the peer and execution thereafter returns to step 1805 to await the next event.

If the message detected at step 1830, is a PUBLICATION message from another peer informing the peer that an image is available for download, execution continues at step 1845.

At step 1845, the peer saves the received message to local storage. The PUBLICATION message may contain preview and/or summary information (e.g., an image thumbnail). Following step 1845, execution thereafter returns to step 1805 to await the next event.

If the message detected at step 1830 is a DOWNLOAD message from another peer that wants to download a datum stored on the peer that received the DOWNLOAD message (as at step 1610 or 1625 of the method 1600), then execution continues at step 1850. At step 1850, the peer uploads the image to the peer which transmitted the DOWNLOAD message. Following step 1830, execution returns to step 1805 to await the next event.

Figure 16:
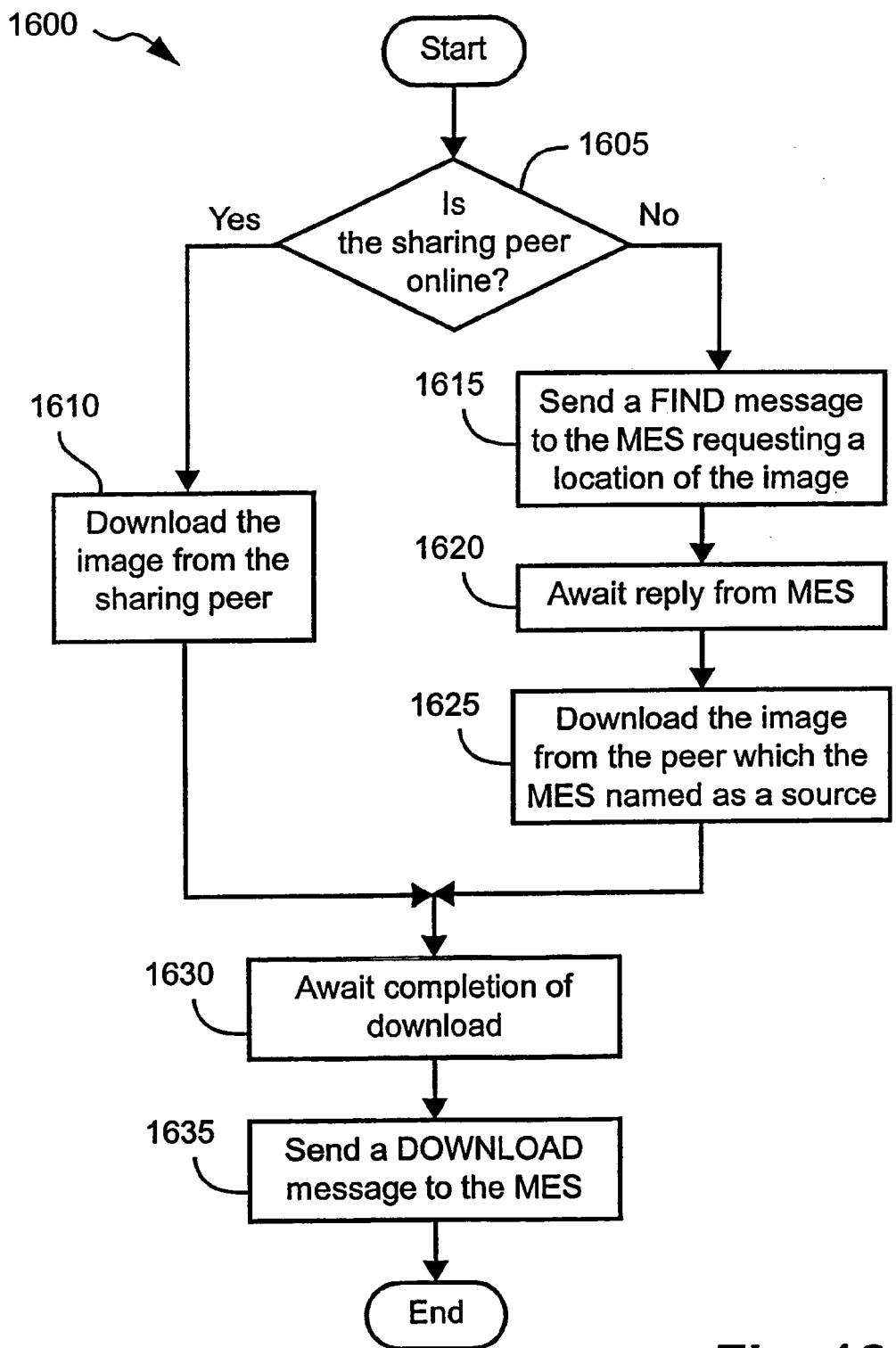
FIG. 16 is a flow diagram showing a method of downloading an image.

The method 1600 of downloading data representing an image, as executed at step 1820, will be described in detail below with reference to FIG. 16. The method 1600 is preferably implemented as software resident on a hard disk drive (not shown) of the peer (e.g., the peer 1950 or 1952) and being controlled in its execution by a processor (not shown) of the peer. The peer will be hereinafter referred to as the "current peer" in order to distinguish it from other peers.

The method 1600 begins at the first step 1605, where if the processor of the current peer determines that a source peer that shared the image with the current peer, is currently online, then execution continues at step 1610. Otherwise, execution continues at step 1615.

At step 1610, the current peer downloads the image from the source peer which shared the image and execution continues thereafter at step 1630.

At step 1615, the current peer sends a FIND message to the MES 1901 requesting the location of the source peer. The MES 1901 processes the FIND message in accordance with the method 100 described above. At the next step 1620, the current peer awaits a reply from the MES 1901. Then at step 1625, the current peer downloads the image from the source peer whose location was provided by the MES 1901, and execution continues thereafter at step 1630.

At step 1630, the current peer awaits completion of the download. Then at step 1635, the current peer sends a DOWNLOAD message to the MES 1901 so that the MES 1901 will be able to adjust estimates of supply and demand accordingly. The DOWNLOAD message is processed by the MES 1901 in accordance with the method 100.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

The advantages of the aforementioned preferred method(s) will now be described by way of example. Assume a user name Alice is online most evenings, and decides to share an digital photo album with her friends Bob and Carol one Thursday evening. Neither of these users (i.e., Bob and Carol) is normally online on Thursday evenings and, as it happens, neither of them is online on this particular Thursday evening. From their past history, the MES 1901 determines that there is a 25% chance that Bob will want to download the images of the digital photo album on Friday evening and a 15% chance that he will want to download the images on Saturday afternoon. The MES 1901 also determines that there is a 10% chance that Carol will want to download the images on Friday morning, a 20% chance that she will want to download the images on Friday evening, and a 5% chance that she will want to download the images on Saturday afternoon.

Continuing the example, peers (e.g., the peers 1950, 1952) being used by further users, Gerard, Richard, and Joe are online at the current time but Joe is never online on Friday or Saturday, whereas Gerard and Richard often are. The MES 1901 concludes that the best course of action is to request that the peers being used by Gerard and Richard upload images from the digital photo album published by Alice since they are online now and will probably cover Bob's and Carol's needs.

The foregoing describes only some embodiments of the present invention, and modifications and/or changes can be made thereto without departing from the scope and spirit of the invention, the embodiments being illustrative and not restrictive.

The invention claimed is:

1. A method of caching data over a network, said method comprising the steps of:
   estimating capacities of each of a plurality of peers connected to said network, wherein for each said peer, multiple capacities are estimated at different points over time, and wherein each said estimate of capacity for each said peer is the product of the probability of the peer being on-line and the bandwidth available to said peer;
   estimating a demand curve for said data from said plurality of peers connected to said network based at least partly on a sum of demand curves of demand for each peer at different points over time, wherein for each peer at each point in time, the demand is a product of one of the estimates of capacity of the peer, a probability of the peer wanting to download said data, and a desirability rating of an author of said data;
   estimating a supply curve for the data from the plurality of peers connected to the network based at least partly on a sum of supply curves of supply for each peer at different points over time, wherein for each peer at each point in time, the supply is a product of one of the estimates of capacity of the peer, and a probability of the peer having said data;
   selecting one or more of the peers so as to balance load on the peers, wherein the estimated capacities of the selected one or more peers vary with time in a similar manner to the demand curve and are utilized to reduce differences between the estimated demand and supply curves at said different points over time; and
   proactively caching said data on the one or more selected peers.

2. A method according to claim 1, further comprising the step of deleting further data from at least one of the selected peers if said supply is greater than said demand.

3. A method according to claim 1, wherein estimates of any one or more of demand and capacity are executed on a central server connected to said network.

4. A method according to claim 1, further comprising the step of selecting a set of the peers connected to said network based on which of the peers are online when an amount of necessary storage capacity is at a maximum.

5. A method according to claim 4, wherein the selecting peers step comprises the step of allocating a weight to each peer in said set.

6. An apparatus for caching data over a network, said apparatus comprising:
   a processor; and
   a memory coupled to the processor comprising:
   capacity estimation means for estimating capacities of each of a plurality of peers connected to said network, wherein for each peer, multiple capacities are estimated at different points over time, and wherein each said estimate of capacity for each said peer is the product of the probability of the peer being on-line and the bandwidth available to said peer;

demand estimation means for estimating a demand curve for said data from said plurality of peers connected to said network based at least partly on a sum of demand curves of demand for each peer at different points over time, wherein for each peer at each point in time, the demand is a product of one of the estimates of capacity of the peer, a probability of the peer wanting to download said data, and a desirability rating of an author of said data;

supply estimation means for estimating a supply curve for the data from the plurality of peers connected to the network based at least partly on a sum of supply curves of supply for each peer at different points over time, wherein for each peer at each point in time, the supply is a product of one of the estimates of capacity of the peer, and a probability of the peer having said data;

peer selection means for selecting one or more of the peers so as to balance load on the peers, wherein the estimated capacities of the selected one or more peers vary with time in a similar manner to the demand curve and are utilized to reduce differences between the estimated demand and supply curves at said different points over time; and storage means for proactively caching said data on the one or more selected peers.

7. A computer readable storage medium storing a computer-executable program, said computer-executable program being executable by a computer so as to control the computer to execute a method for caching data over a network, said computer-executable program comprising:

code for estimating capacities of each of a plurality of peers connected to said network, wherein for each said peer, multiple capacities are estimated at different points over time, and wherein each said estimate of capacity for each said peer is the product of the probability of the peer being on-line and the bandwidth available to said peer;

code for estimating a demand curve for said data from said plurality of peers connected to said network based at least partly on a sum of demand curves of demand for each peer at different points over time, wherein for each peer at each point in time, the demand is a product of one of the estimates of capacity of the peer, a probability of the peer wanting to download said data, and a desirability rating of an author of said data;

code for estimating a supply curve for the data from the plurality of peers connected to the network based at least partly on a sum of supply curves of supply for each peer at different points over time, wherein for each peer at each point in time, the supply is a product of one of the estimates of capacity of the peer, and a probability of the peer having said data;

code for selecting one or more of the peers so as to balance load on the peers, wherein the estimated capacities of the selected one or more peers vary with time in a similar manner to the demand curve and are utilized to reduce differences between the estimated demand and supply curves at said different points over time; and code for proactively caching said data on the one or more selected peers.

* * * * *